Dec. 23, 1952 W. L. MARTIN 2,622,871

APPARATUS FOR AUTOMATICALLY REPRODUCING CONTOURS

Filed Feb. 13, 1947 10 Sheets-Sheet 1

INVENTOR.
WENDELL L. MARTIN
BY
Bosworth & Sessions
ATTORNEYS.

Dec. 23, 1952 W. L. MARTIN 2,622,871

APPARATUS FOR AUTOMATICALLY REPRODUCING CONTOURS

Filed Feb. 13, 1947 10 Sheets-Sheet 2

INVENTOR.
WENDELL L. MARTIN
BY
Bosworth & Sessions
ATTORNEYS.

Dec. 23, 1952 W. L. MARTIN 2,622,871

APPARATUS FOR AUTOMATICALLY REPRODUCING CONTOURS

Filed Feb. 13, 1947 10 Sheets-Sheet 3

INVENTOR.
WENDELL L. MARTIN
BY
Bosworth & Sessions
ATTORNEYS

Dec. 23, 1952 W. L. MARTIN 2,622,871

APPARATUS FOR AUTOMATICALLY REPRODUCING CONTOURS

Filed Feb. 13, 1947 10 Sheets-Sheet 4

INVENTOR.

WENDELL L. MARTIN

BY

Bosworth & Sessions

ATTORNEYS.

INVENTOR.
WENDELL L. MARTIN
BY Bosworth & Sessions
ATTORNEYS.

INVENTOR.
WENDELL L. MARTIN
BY Bosworth + Sessions
ATTORNEYS.

INVENTOR.
WENDELL L. MARTIN
BY Bosworth & Sessions
ATTORNEYS.

Dec. 23, 1952 W. L. MARTIN 2,622,871

APPARATUS FOR AUTOMATICALLY REPRODUCING CONTOURS

Filed Feb. 13, 1947 10 Sheets-Sheet 8

INVENTOR.
WENDELL L. MARTIN
BY
Bosworth + Sessions
ATTORNEYS.

Dec. 23, 1952 W. L. MARTIN 2,622,871

APPARATUS FOR AUTOMATICALLY REPRODUCING CONTOURS

Filed Feb. 13, 1947 10 Sheets-Sheet 9

INVENTOR.
WENDELL L. MARTIN
BY *Bosworth + Sessions*
ATTORNEYS

INVENTOR.
WENDELL L. MARTIN
BY
Bosworth + Sessions
ATTORNEYS

UNITED STATES PATENT OFFICE 2,622,871

APPARATUS FOR AUTOMATICALLY REPRODUCING CONTOURS

Wendell L. Martin, Shaker Heights, Ohio, assignor to The Martin Brothers Electric Company, Cleveland, Ohio, a corporation of Ohio Application February 13, 1947, Serial No. 728,223

32 Claims. (Cl. 266—23)

Figure 1:
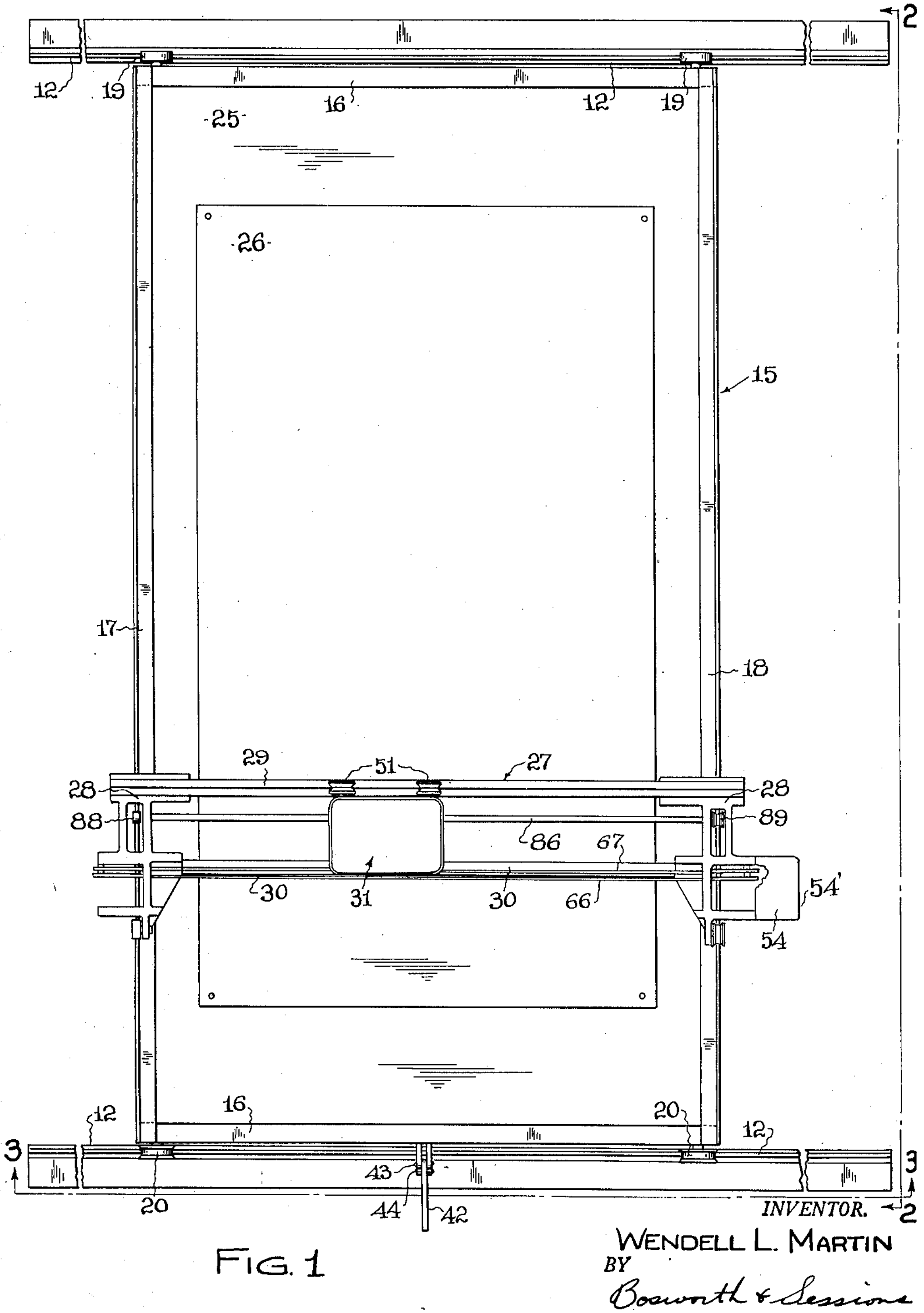

This invention relates to an apparatus for reproducing contours and particularly to apparatus comprising a tracer adapted automatically to follow a contour or pattern, the motion of the tracer being transmitted to a tool such as a cutting torch, for example, which is constrained to follow the same path as the tracer, thereby to reproduce the contour or pattern.

The present invention involves several instrumentalities which cooperate to produce a highly advantageous apparatus. The several instrumentalities, however, may be useful separately or in combination with other instrumentalities. Thus, the apparatus comprises a line following mechanism or tracer arranged to follow a line or pattern and depending for its action upon the flow of electric current between a tracer and the line or pattern. Through appropriate electric circuits, the tracer is driven along the line in such manner as to maintain the amount of overlap between line and tracer substantially constant. The electrical apparatus is preferably operated on alternating current with circuits arranged so that correcting impulses are applied to the steering mechanism at least at frequency of the power circuit. Thus with an ordinary 60 cycle power supply, there are at least 60 correcting impulses per second, insuring a high degree of accuracy and correction of errors before the errors become large; this accuracy can be increased in systems in which a power supply of higher frequency is employed. The driving mechanism is arranged, according to the preferred form of my invention, in such manner that there is no contact required between a driving wheel or the like and the pattern. Mechanism is provided for interconnecting the follower with a carriage supporting a cutting torch or the like whereby the torch may be moved accurately with the tracer. This mechanism is preferably arranged so that the tracer and the torch may be vertically aligned with the pattern interposed between them, and the workpiece disposed beneath the torch and in vertical alignment with the pattern, thus providing a compact apparatus. Provision is made also whereby the tracer and torch can travel over a pattern of large area without requiring floor space for the apparatus greatly in excess of the space required for the workpiece or pieces. The arrangement preferably is such as to permit the machine to operate on one workpiece while another workpiece is being placed in position within the apparatus for the next operation.

A general obect of the invention is the provision of a contour reproducing machine which is adapted to operate rapidly and accurately to reproduce a pattern or contour. Another object is the provision of a machine adapted accurately to follow a line or contour having an electrical conductivity different from that of the background material on which the contour is laid out. Another object is the provision of simple and efficient electrical circuits for such devices which will result in the accurate control of the line follower without substantial hunting or deviation from the contour. Further objects are the provision of mechanisms and circuits whereby the starting of the apparatus is made simple, and the provision of means whereby the follower may be driven along the contour constantly at the desired lineal speed. Other objects include the provision of an automatic line following apparatus in which the line follower is driven along the contour by driving means which require no contact with the pattern itself; the provision of contour cutting apparatus in which one workpiece can be operated upon while another is being placed in position for subsequent operation; the provision of a contour cutting machine in which the line following mechanism, pattern, torch and workpiece are all vertically aligned, thus greatly reducing the floor space required by the apparatus as compared with the floor space required by prior devices adapted to work on materials of corresponding size.

Figure 2:
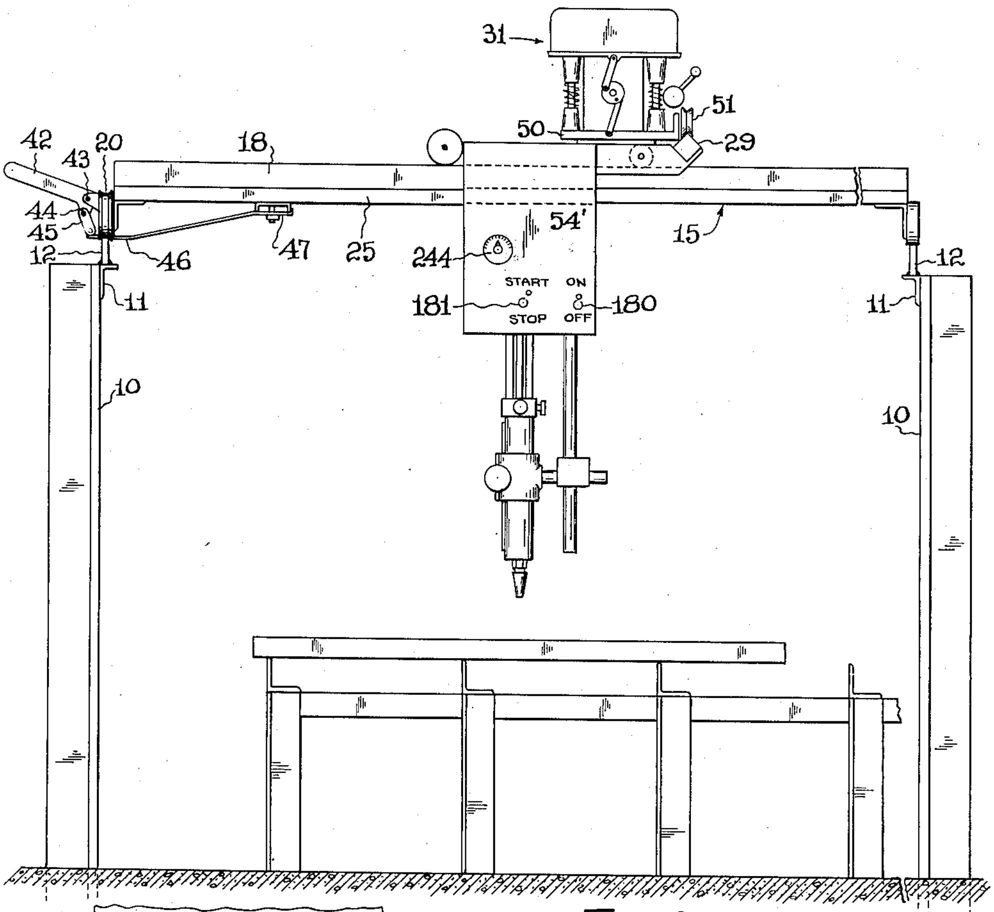
Figure 12:
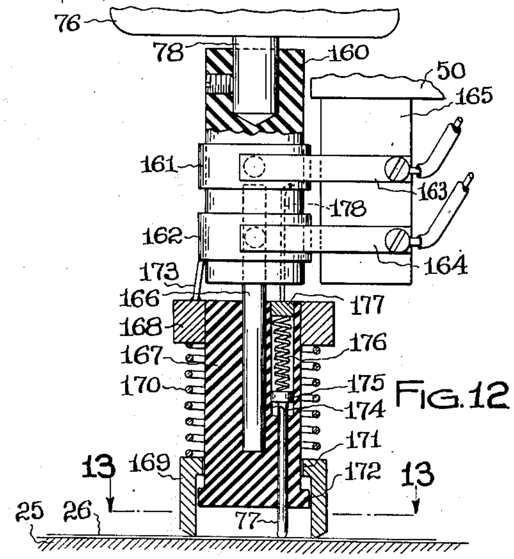
Figure 13:
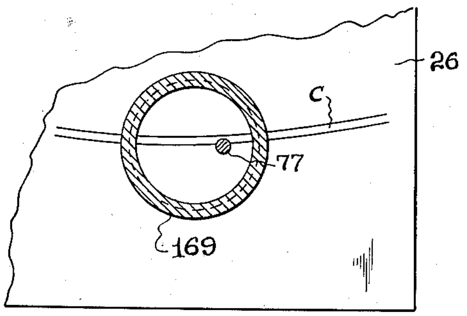
Figure 3:
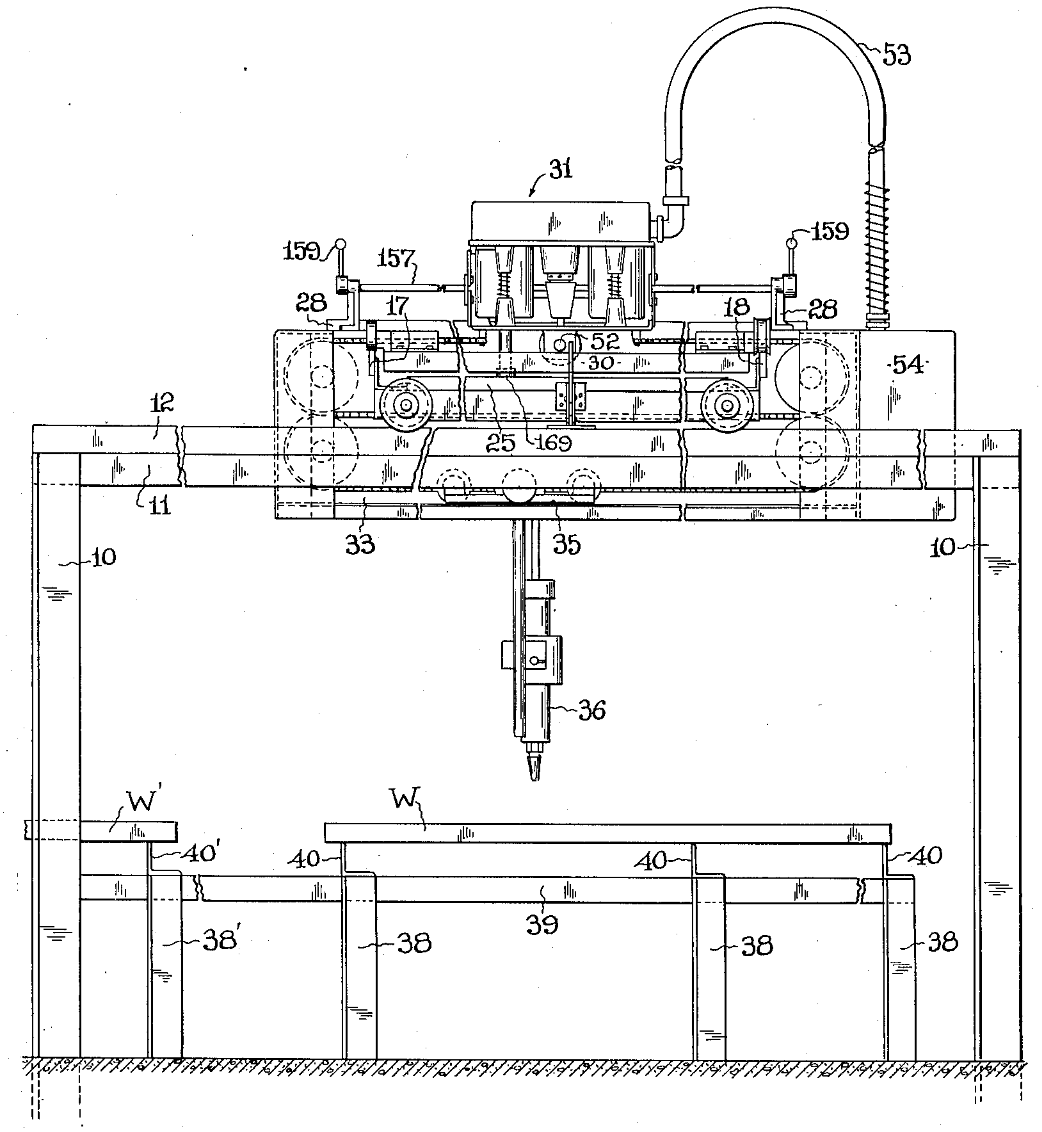
Figure 4:
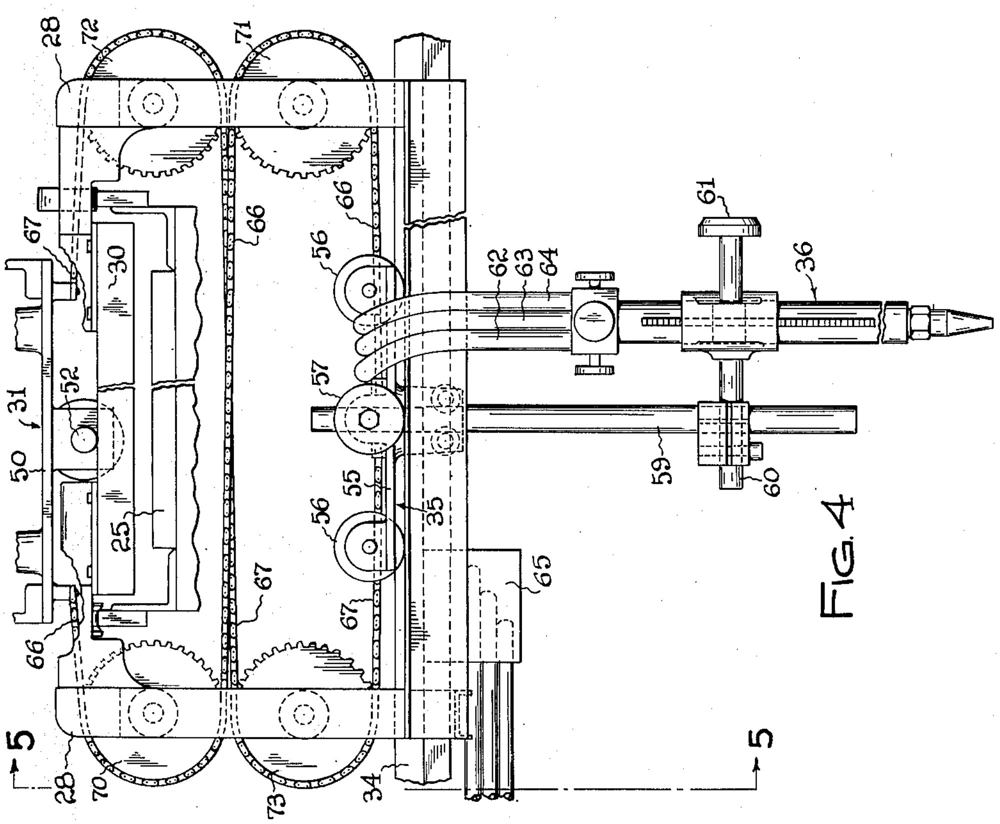
Figure 5:
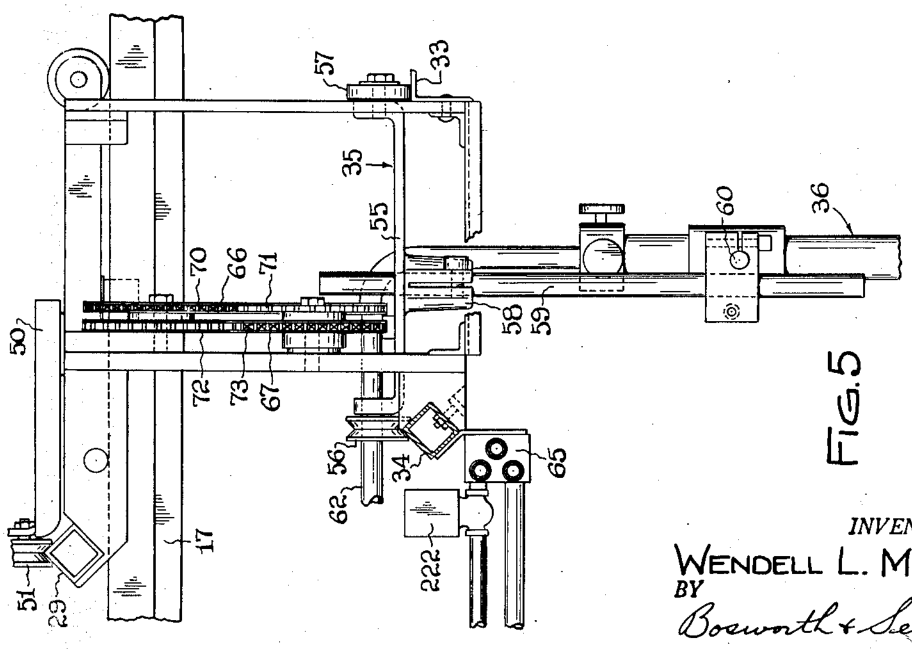
Figures 6, 7, 8:
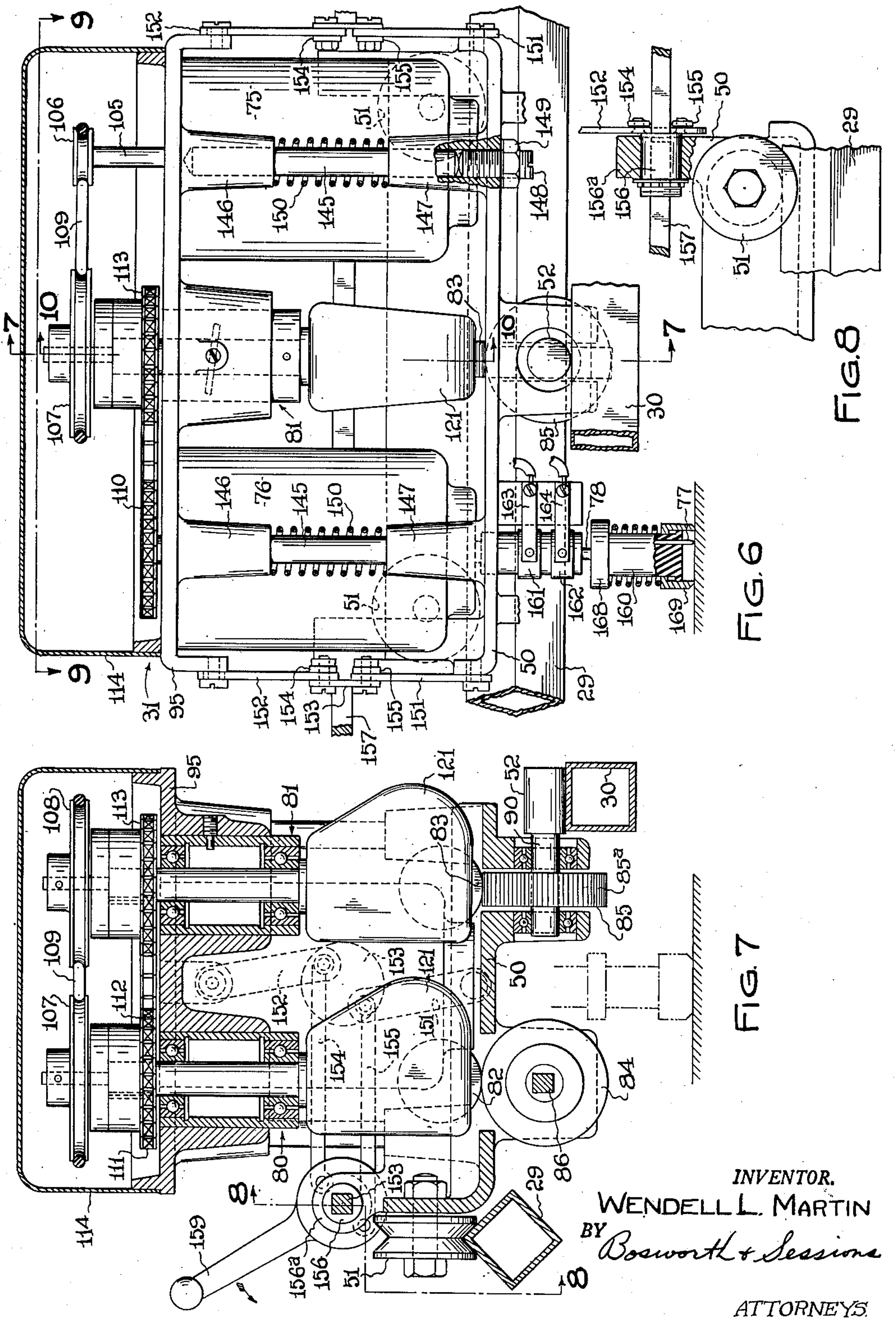
Figures 9, 10, 11:
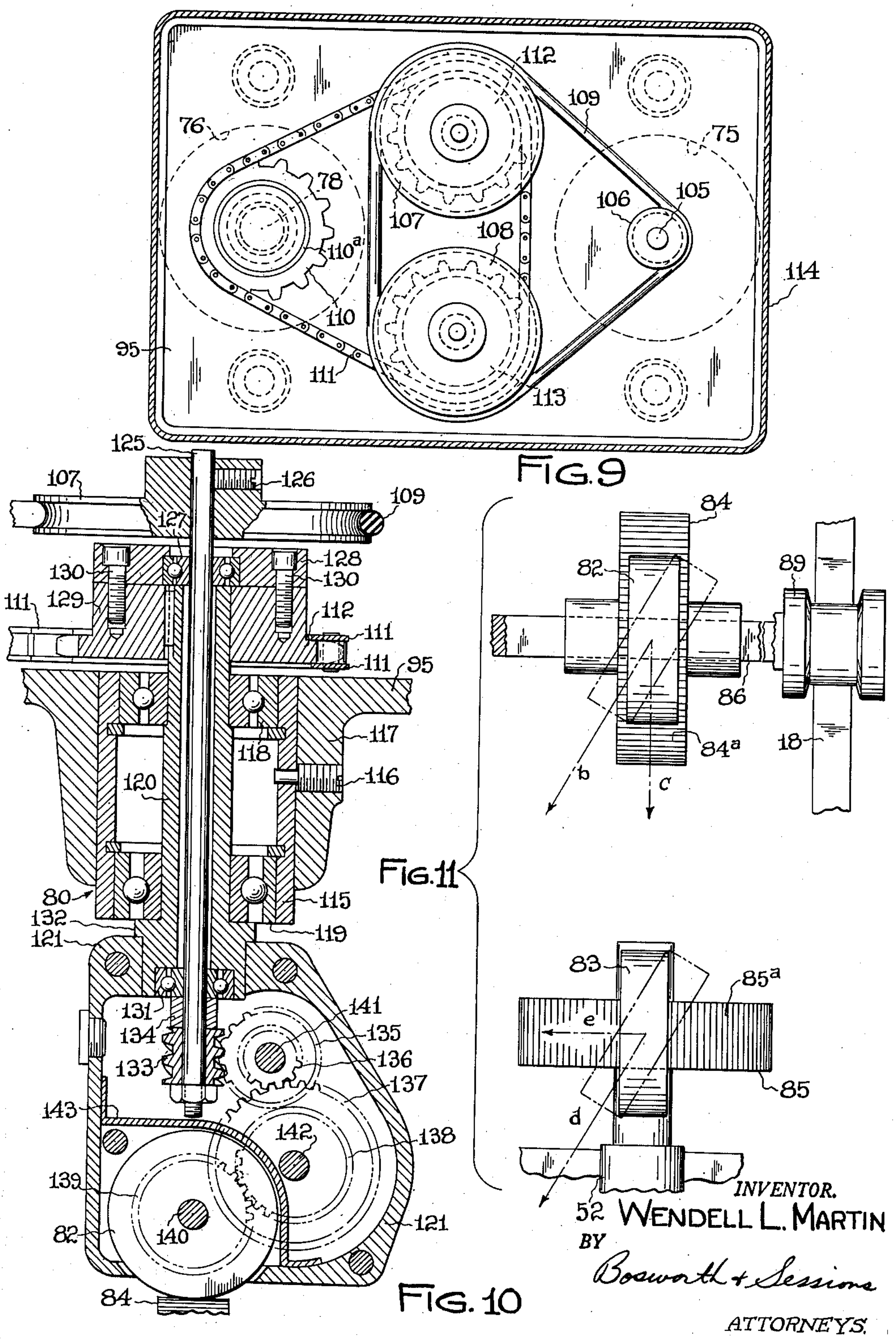
Figure 14:
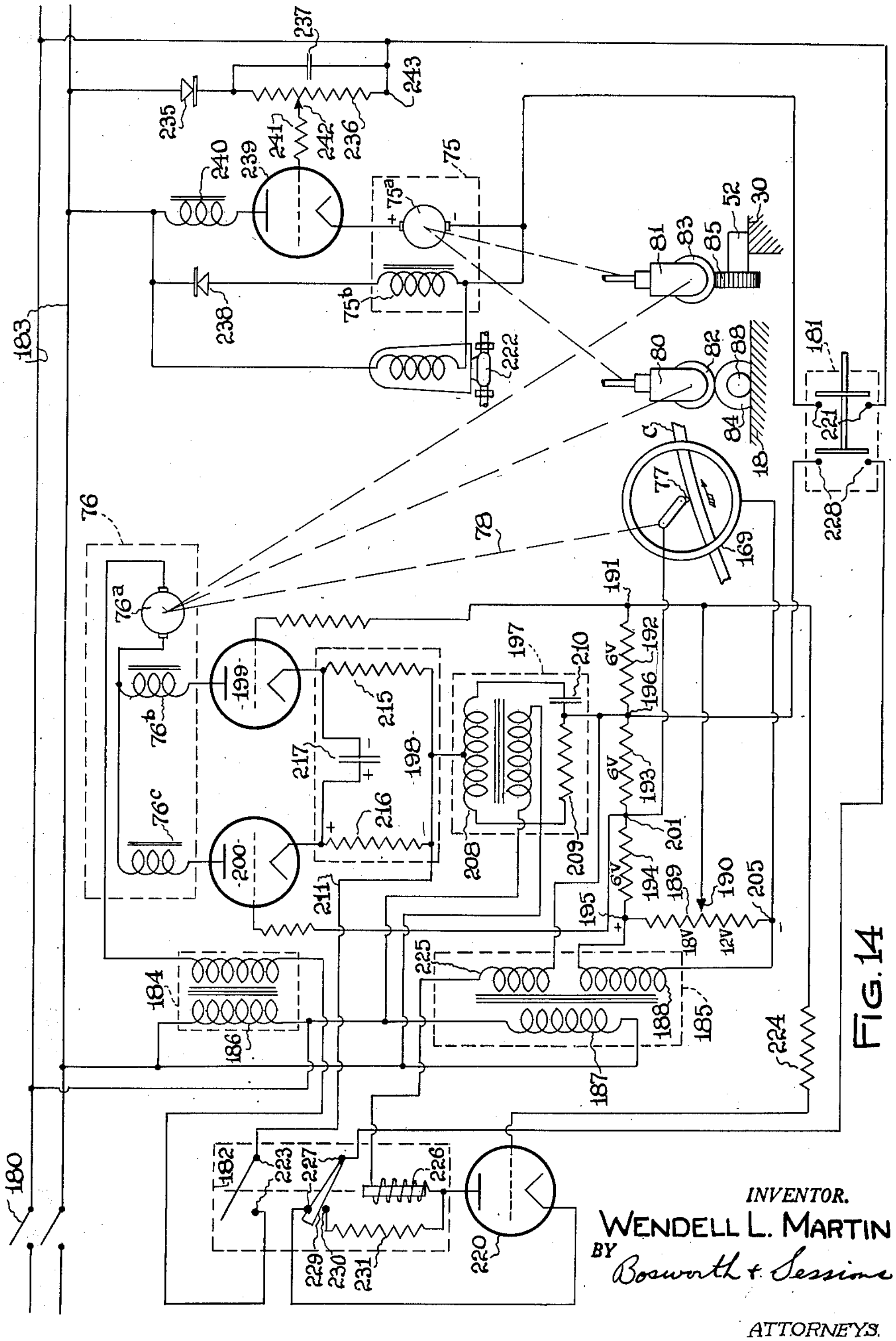
Figure 15:
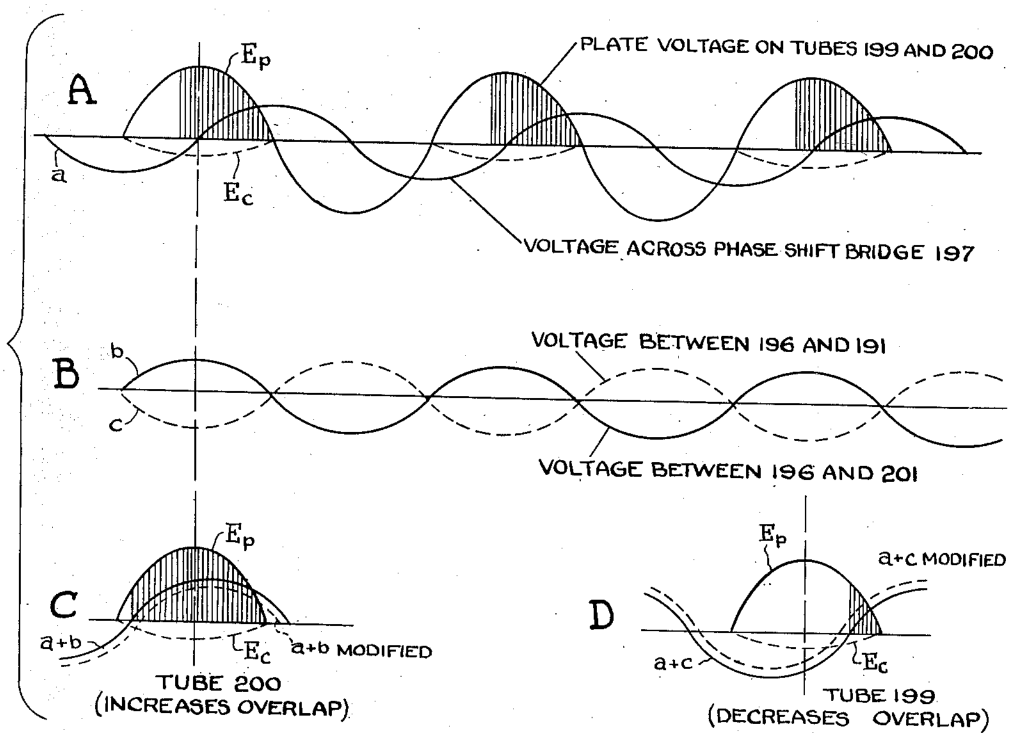
Figures 16, 17:
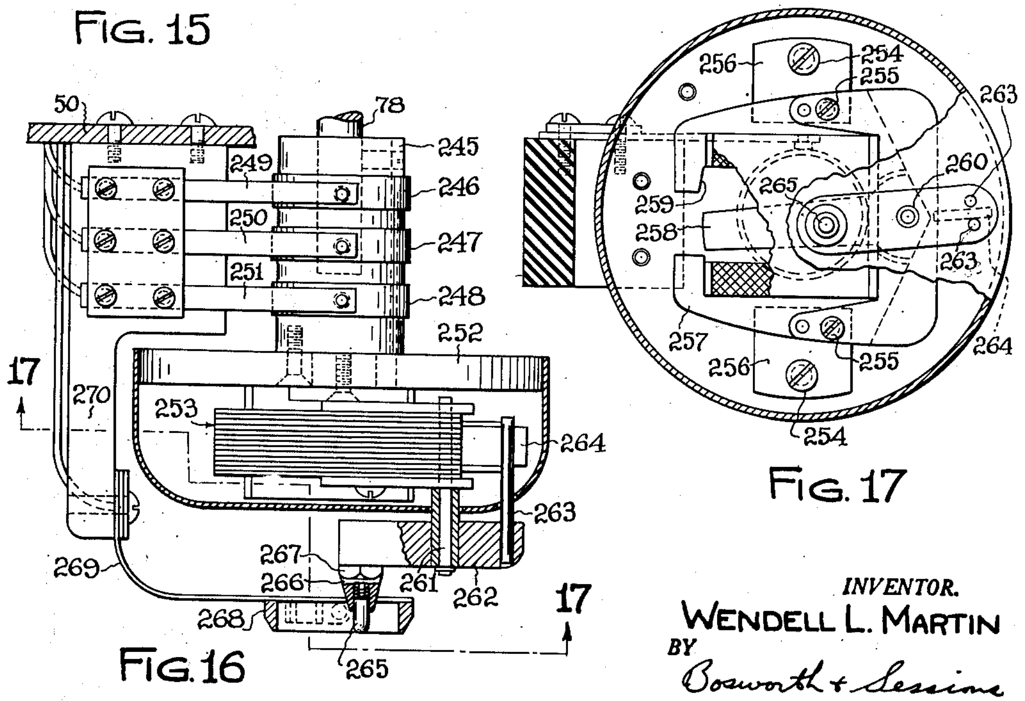
Figure 18:
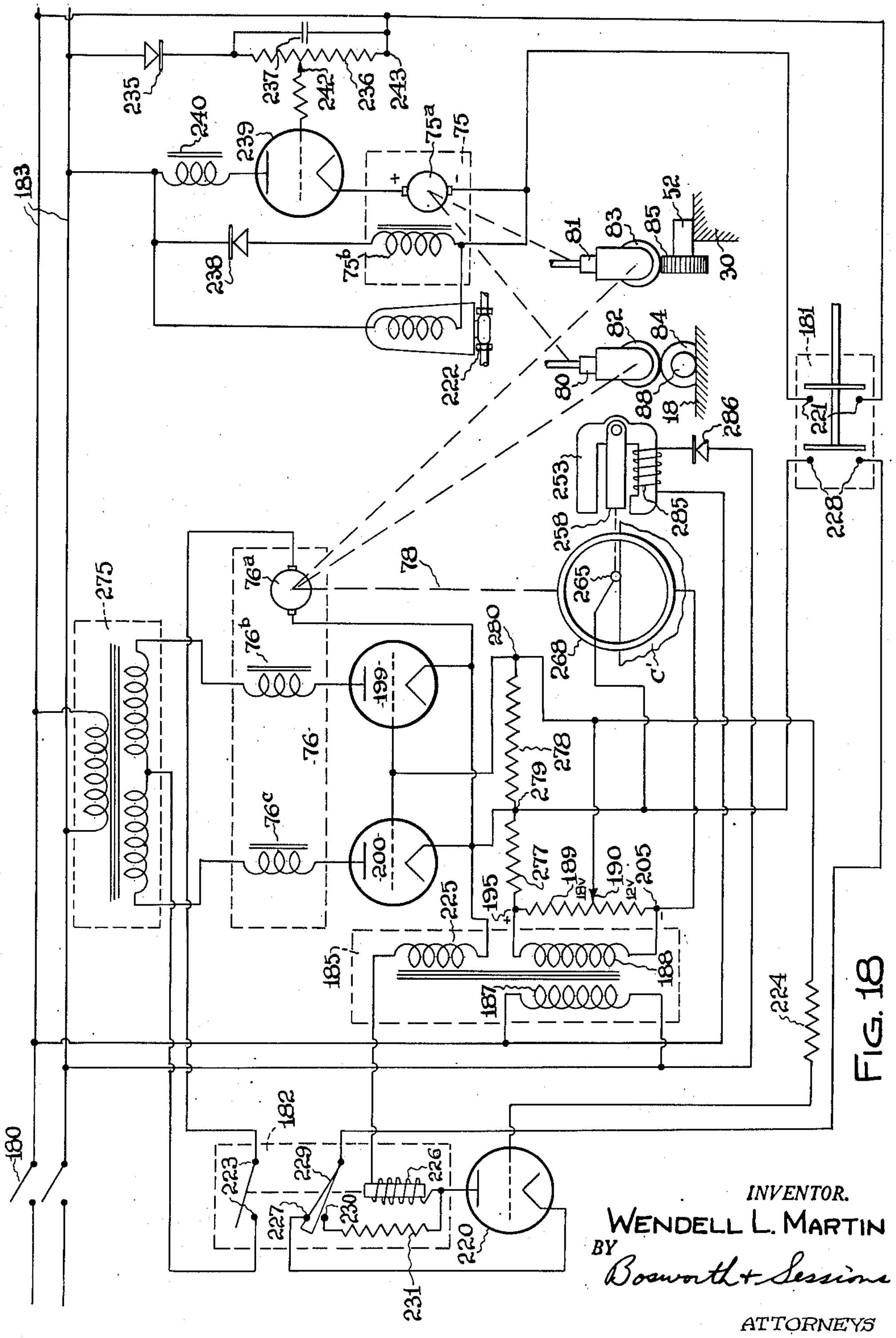
Figure 19:
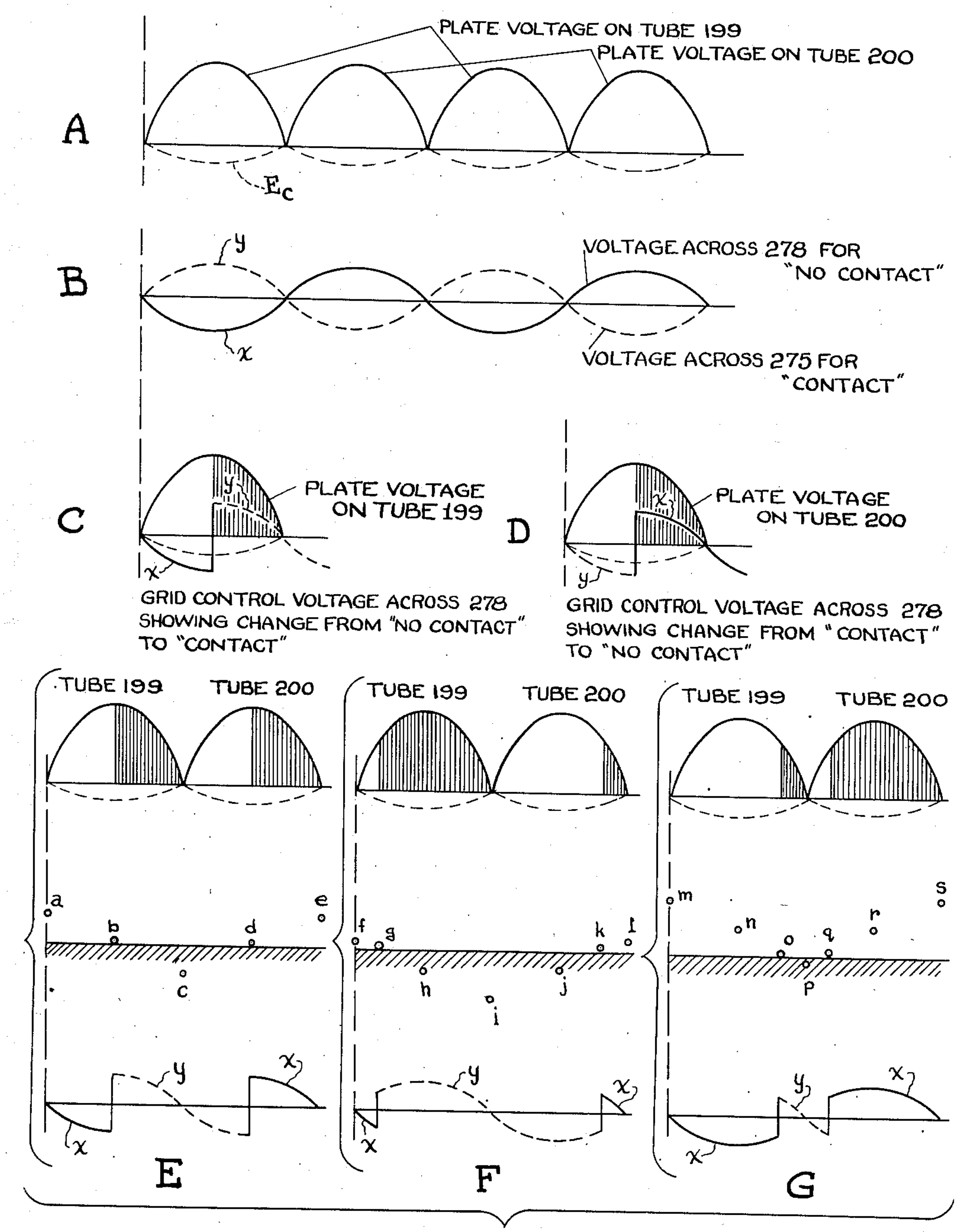

Further objects and advantages of the invention will become apparent from the following description of preferred forms thereof, reference being made to the accompanying drawings in which Figure 1 is a plan view of a preferred form of apparatus; Figure 2 is an end elevation of the apparatus shown in Figure 1, the view being taken as indicated by line 2—2 of Figure 1; Figure 3 is a side elevation of the apparatus shown in Figure 1, the view being taken as indicated by the line 3—3 of Figure 1; Figure 4 is a side elevational view on an enlarged scale showing the mechanism for interconnecting the carriage which supports the tracer and its drive mechanism and the torch supporting carriage; Figure 5 is an end elevational view of the same mechanism, the view being taken as indicated by the line 5—5 of Figure 4; Figure 6 is a side elevational view on an enlarged scale showing the tracer carriage and the drive mechanism therefor; Figure 7 is a sectional view of the tracer carriage taken along the line 7—7 of Figure 6; Figure 8 is a sectional detail of the carriage taken along the line 8—8 of Figure 7;

Figure 9 is a view looking down on the carriage and illustrating the driving and steering connections, the view being taken along the line 9—9 of Figure 6; Figure 10 is a sectional detail on an enlarged scale taken along the line 10—10 of Figure 6 and illustrating one of the carriage drive spindles; Figure 11 is a diagrammatic view illustrating the drive for the tracer carriage; Figure 12 is a detail of the follower and its supporting spindle; Figure 13 is a detail as indicated by the line 13—13 of Figure 12 and showing the relationship between the follower point and the contour which is to be followed; Figure 14 is a wiring diagram of a preferred electrical circuit for the apparatus; Figure 15 diagrammatically illustrates the operation of the circuit of Figure 14 under varying conditions of operation; Figures 16 and 17 illustrate a modified form of follower; Figure 18 is a wiring diagram of a preferred type of circuit for use with the modified follower; and Figure 19 diagrammatically illustrates the operation of the circuit of Figure 18.

*General arrangement*

The general arrangement of the apparatus is illustrated in Figures 1, 2 and 3. As there shown, the supporting structure comprises a series of vertical supports 10, which may be set into the floor as shown, and to the upper ends of which are secured horizontal angle irons 11 carrying longitudinally extending tracks 12. Preferably the supporting frame is unobstructed at its ends to facilitate positioning of the workpieces. The tracks 12 function to support the movable main frame indicated in general at 15 and comprise end members 16 extending parallel with the rails 12, and transversely extending rails 17 and 18, the movable main frame being supported on the rails 12 by rollers 19 and 20. It will be noted that the rollers 20 are grooved to retain the main frame on the supporting tracks 12. The movable main frame carries a pattern support 25 adapted to receive a pattern 26. The main frame rails 17 and 18 carry the sub-frame indicated in general at 27, the sub-frame comprising end members 28 and sub-frame rails 29 and 30 extending at right angles to the main frame rails 17 and 18; the main or follower carriage indicated in general at 31 is supported on the sub-frame rails. The carriage is movable along the sub-frame rails 29 and 30, and the sub-frame 27 is movable along the main frame rails 17 and 18. Hence the carriage can be moved in such a manner that the follower carried thereby will reach substantially all points of the pattern support 25 within the marginal portions thereof.

As shown particularly in Figures 3 to 5, the sub-frame 27 also includes rails 33 and 34 which extend parallel to the tracks 29 and 30 beneath the pattern support 25. Tracks 33 and 34 support the tool carriage indicated in general at 35, which carries any suitable cutting tool marking device or the like, a cutting torch 36, which may be of conventional construction, being shown in the present embodiment.

In order to support the work in position for cutting, I provide a work-support comprising vertical members 38, horizontal members 39 and work-engaging angle irons 40 which directly support the work such as the workpieces W and W'. The main frame is arranged to be moved manually from one working position to another and may be locked in position by the toggle brake mechanism shown in Figures 1 and 2 and consisting of a handle member 42 pivoted as at 43 to a bracket supported by the frame member 16 and having an end portion 44 pivotally connected to the toggle link 45, which in turn is pivoted to one end of the brake member 46, the opposite end of the member 46 being secured to the underside of the pattern support 25 as at 47. Downward movement of the handle urges the brake member 46 into engagement with the upper surface of one of the tracks 12 and thus frictionally locks the main frame against movement with respect to the tracks. In its locked position, the toggle links 44 and 45 are moved over center to retain the brake member 46 against the track.

It will be noted that inasmuch as the tracks 12 and the associated parts of the supporting structure may be indefinitely long and preferably are more than twice as long as the end members 16 of the main frame 15, the main frame can be positioned adjacent one end of the apparatus, for example, as shown in Figures 1 and 3, and the apparatus may be operated to cut a pattern in a workpiece W while another workpiece W' is being placed in position on the work supporting members 40'. The work support and main supporting structure thus provide two working stations, thereby increasing the productive capacity of the apparatus.

In order to move the torch over a workpiece and thereby to cut a desired contour, the main carriage 31 is provided with an automatic line follower or tracer, preferred forms of which are described in detail below, so that the carriage will automatically follow a line or contour. The components of the motion of the carriage 31 in directions parallel to the main frame rails 17 and 18 result in movement of the sub-frame 27 along the tracks 17 and 18 and corresponding movement of the tool or torch carriage 35. The components of the motion of the carriage 31 in directions normal to the tracks 17 and 18, i. e., parallel to sub-frame rails 29 and 30, are transmitted to torch carriage 35 by the mechanism shown particularly in Figures 3, 4 and 5.

As shown in those figures, the main carriage 31 includes a base 50 provided with a pair of grooved wheels 51 engaging the square track 29 and a plain wheel 52 engaging the track 30 and arranged to drive the carriage along the tracks 29 and 30 in accordance with the requirements of the contour being reproduced. Power for the carriage is supplied through flexible cable 53, the electronic components of the carriage control being disposed within the housing 54, the end surface 54' of which comprises a control panel.

The torch supporting carriage 35 is disposed on the tracks 33 and 34 immediately beneath the main carriage 50. The carriage 35 comprises a base 55 provided with a pair of grooved wheels 56 engaging the square track 34 and a plain roller 57 engaging the angle iron track 33 (see Figure 4). The base also is provided with a collet or clamp 58 in which the downwardly extending rod 59 is adjustably supported. The rod 59 in turn carries the torch 36 by means of the adjustable supporting bracket 60. The torch is adjustable vertically by the knob 61 and is supplied with acetylene gas, low pressure oxygen and high pressure oxygen through the flexible hoses 62, 63 and 64, respectively, the hoses extending over the torch carriage 35, resting on the base 55 and connecting with distributor head 65 from which conduits extend through suitable control valves, including a solenoid valve 222 for controlling the high pressure oxygen as hereinafter described, to the supply tanks for the various gases.

As noted above, components of the motion of the main carriage in directions parallel to the tracks 17 and 18 are transmitted directly to the torch carriage 35 because the tracks 33 and 34 are rigidly supported by the end frame members 28 of the sub-frame 27. However, it is not possible to make a direct vertical connection for transmitting the motions of the main carriage along the tracks 29 and 30 to the torch carriage, because the pattern support 25 and the pattern 26 are interposed between the carriages. In order to transmit these motions of the main carriage to the torch carriage, the two carriages are interconnected by chains 66 and 67, each chain having its ends connected to opposite ends of the main and torch carriage, and the chain 66 passing around the sprockets 70 and 71 and the chain 67 passing around sprockets 72 and 73. All of these sprockets are mounted in the end frame members 28 of the sub-frame 27. In Figure 4 of the drawings, the chains are shown as diverging slightly for convenience in illustration. In practice, the reaches of the chains between the sprockets are substantially parallel.

It will be seen that by this arrangement, motions of the carriage 31 along the tracks 29 and 30 are transmitted accurately to the carriage 35. Movement of the carriage 31 to the right in Figure 4, for example, will pull the chain 66 around the sprockets 70 and 71, and thus pull the carriage 35 in the same direction at the same speed and for the same distance as the cariage 50. During motion to the right, the chain 67 is held taut by the pull exerted by carriage 35 on it. When the carriage 50 moves in the opposite direction, the chain 67 is pulled over sprockets 72 and 73, thus transmitting the motion of carriage 31 to carriage 35 in the opposite direction. At the same time, the chain 66 is held taut by the carriage 35. Thus, the torch carriage accurately follows the movements of the main carriage.

*Main carriage drive*

The motion of the main carriage 31 along the contour, as shown particularly in Figures 6 and 7, is produced by two motors which are mounted thereon—a driving motor 75, which propels the carriage at substantially constant speed, and a steering motor 76, which steers the carriage in accordance with signals received from a tracer or follower point 77 in order to cause the carriage to move in such a path that the tracer automatically is maintained in contact with the contour which is to be reproduced.

The electrical circuits whereby the operation of the steering motor is controlled will be described in detail below. For present purposes, it is sufficient to state that the tracer or follower 77 is carried by the shaft 78 of the steering motor 76. The tracer is offset slightly from the center of the shaft, the driving arrangement being such that a line drawn through the centers of the shaft and tracer will indicate the direction of movement of the carriage. The electrical circuits actuate the steering motor to maintain a predetermined amount of overlap between the tracer point 77 and a contour C of the pattern 26, as shown in Figure 13. The steering motor shaft 78 rotates the point 77 at the same time that it steers the driving mechanism, thus maintaining the correct relationship between the direction of movement of the carriage and the position of the offset tracer point with respect to the center of the shaft 78.

While it is possible to operate my device by employing a single driving wheel driven by the driving motor and mounted on a spindle steered by the steering motor to determine the direction of movement, such an arrangement ordinarily requires that the driving wheel operate on the pattern. This is undesirable because of the resultant wear on the pattern. Accordingly, I preferably employ an arrangement such as shown in the drawings wherein the driving forces of the carriage are exerted on the main frame tracks 17 and 18 and the sub-frame tracks 29 and 30. As these tracks extend at right angles to each other, the motion of the carriage over the pattern in any direction can be resolved into components in directions parallel to the respective tracks.

The movement of the carriage is separated into its two components one parallel to tracks 17 and 18 and one parallel to tracks 29 and 30, and the proper driving forces are exerted on the tracks by mechanism embodying steerable driving spindle assemblies 80 and 81 provided with intermediate driving wheels 82 and 83, respectively. The position of the spindles is controlled by mechanism hereinafter described so that the intermediate driving wheels are always disposed in planes parallel to each other. The intermediate driving wheels frictionally engage friction wheels 84 and 85, respectively, which are disposed at right angles to each other. The wheel 84 has a sliding engagement with a suitable square shaft 86 and thus drives the main drive wheels 88 and 89 which engage the main frame tracks 17 and 18 (see Figure 1) while the wheel 85 drives the drive roller 52 through the shaft 90, the roller 52 being in engagement with the track 30 as previously described (see Figures 3, 6 and 7).

The intermediate drive wheels 82 and 83 are driven at the same substantially constant speed by the drive motor 75, and the spindles 80 and 81, upon which they are mounted, are steered by the steering motor 76 so that the planes in which the intermediate drive wheels lie are always parallel to the desired direction of movement of the carriage as determined by the contour. The manner in which such a driving and steering arrangement results in the desired motion of the carriage will be evident from the diagrammatic illustration in Figure 11. There, in the full line position, the intermediate driving wheels 82 and 83 are disposed to lie in the plane of friction wheel 84. In this position, rotation of the intermediate wheel 82 will result in rotation of the friction wheel 84 at the same peripheral speed. The wheel 84 drives the drive wheels 88 and 89 through the shaft 86 and thus moves the carriage in a direction parallel to the rail or track 18. Thus, in the embodiment shown, the carriage and the entire sub-frame will move along the rail 18 at a speed directly proportional to the peripheral speed of the drive wheel 82, but less than that speed because the wheel 89 is of smaller diameter than the wheel 84.

With the wheel 82 lying in the same plane as the wheel 84, the wheel 83 which also lies in that same plane is necessarily disposed at right angles to the wheel 85. In this position, the wheel 83 merely slides on the serrated surface of the wheel 85 without any resultant rotation of the wheel 85. Thus, the only motion of the carriage is in a direction parallel to the rails 17 and 18. If the planes of the intermediate driving wheels were rotated 90°, then wheel 82 would be disposed at right angles to wheel 84 and wheel 83 would lie in the plane of wheel 85. Then the wheel 84 would not rotate and the motion of the carriage would be parallel to the rails 29 and 30 at a speed determined by peripheral speed of intermediate driving wheel 83, while wheel 82 would slide on the serrated surface of wheel 84.

If, because of a change in the direction of the pattern, the steering motor should rotate the spindles 80 and 81 to place the wheels 82 and 83 in the positions shown in broken lines, then the wheel 82, whose peripheral speed is indicated by the vector *b* will drive the wheel 84 at a speed corresponding to the component of the speed of the wheel 82 parallel to the rail 18, this being indicated by the vector *c*. At the same time, the wheel 83, whose peripheral speed is represented by the vector *d* (which is equal to vector *b*), will drive the wheel 85 at a speed corresponding to the component of the speed of wheel 83 in a direction parallel to the track 30 as indicated by the vector *e*. The resultant motion of the carriage is the sum of the vectors *c* and *e*, which is always equal to vector *b* and to vector *d*; the motion is therefore in proportion to the common peripheral speed of the wheels 82 and 83. Thus, the resultant motion of the carriage due to the engagement between the drive wheels 89 and 52 and the rails 18 and 30, respectively, will be in the same direction as the vectors *b* and *d* and hence parallel to the planes of wheels 82 and 83; the speed of the carriage, however, will be reduced in proportion to the relationship between the diameters of the drive wheels 89 and 52 and the diameters of the wheels 84 and 85. While the direction of the motion of the carriage varies in accordance with the pattern being followed, the lineal speed will remain constant so long as the rotational speed of the wheels 82 and 83 remains constant.

To provide a driving connection between the driving motor 75 and the spindles 80 and 81 and hence the intermediate driving wheels 82 and 83, the driving motor 75 is mounted on the underside of the upper member 95 of the carriage body and has its shaft 105 projecting upwardly through the member 95. The upper end of shaft 105 is provided with a pulley 106 which drives spindle driving pulleys 107 and 108, for spindles 80 and 81, respectively, through belt 109, see Figures 6, 7 and 9. Inasmuch as pulleys 107 and 108 are of the same size, they will be driven at the same rotational speed.

Steering motor 76 is also mounted on the underside of the upper frame member 95. The lower end of the motor shaft 78 projects beneath the bottom frame member 50 and carries the tracer 77; the upper end of the shaft carries the sprocket 110 which, through the chain 111, drives the steering sprockets 112 and 113 of the spindles 80 and 81, respectively. If desired, the sprocket 110 may be provided with an annular rubber insert 110*a* to dampen small vibration of the steering motor before the vibrations are transmitted to the spindles. Thus, rotation of the shaft of the steering motor will rotate the steering sprockets 112 and 113 and the tracer 77 through the same angular distance, for the reason that the tracer is connected directly to the shaft and the sprockets 110, 112 and 113 are all of the same size. The pulleys, sprockets, belt and chain are all enclosed within a suitable housing 114.

The driving and steering actions of the motors 75 and 76, respectively, are transmitted from the driving pulleys 107 and 108 and the steering sprockets 112 and 113 through the spindles 80 and 81. Spindle 80 is illustrated on an enlarged scale in Figure 10 of the drawings; inasmuch as the spindles are of identical construction, only spindle 80 is described in detail herein. As shown in Figure 10, the spindle comprises an outer sleeve 115 secured as by a set screw 116 in the boss 117 which extends downwardly from the member 95. Sleeve 115 supports suitable ball bearings 118 and 119, which in turn rotatably support the inner sleeve 120. The upper end of the inner sleeve 120 is keyed to sprocket 112, and at its lower end sleeve 120 carries a housing 121 in which the intermediate driving wheel 82 is mounted. Thus, rotation of the sprocket 112, in accordance with rotation of the steering motor 76 transmitted through the chain 111, will result in corresponding rotation of the inner sleeve 120 and corresponding steering movement of the intermediate driving wheel 82.

The driving effort of the driving motor 75 is transmitted to the intermediate driving wheel 82 through the shaft 125 to the upper end of which the pulley 107 is secured as by a set screw 126. Shaft 125 is supported near its upper end by a ball bearing 127 secured at the upper end of sleeve 120 by a cap 128 which is mounted on the hub portion 129 of the sprocket 112 by suitable recessed head screws 130.

The lower end of shaft 125 is supported by a ball bearing 131 carried in a recess in the enlarged lower end 132 of the inner sleeve 120. A worm 133 is secured to the lower end of shaft 125, a spacing sleeve 134 being interposed between the worm and the lower face of the bearing 131. The drive to the intermediate driving wheel 82 is through a gear train made up of the worm 133, worm wheel 135, pinion 136, gear 137 and gears 138 and 139. Gear 139 is mounted on shaft 140 which supports the drive wheel 82, worm wheel 135 and pinion 136 are mounted on the shaft 141, and gears 137 and 138 are mounted on shaft 142. All of these shafts are supported by suitable bearings in the housing 121. The housing is clamped to the lower enlarged portion 132 of the inner sleeve 120 so that steering motions of the sleeve 120 will be transmitted to the housing. In order to prevent lubricant from the gear train reaching the intermediate driving wheel 82, a shield 143 is secured to the interior of the housing and extends over the upper portion of the wheel 82.

In order to provide for easy assembly of the carriage and also to provide a convenient means for disconnecting the carriage driving and steering mechanism, the upper frame member 95 of the carriage, which supports the driving motors, spindles 80 and 81 and associated mechanisms, is formed separately from the bottom frame member 50 on which the wheels 51 and 52 and friction wheels 84 and 85 are mounted. As shown in Figures 6 and 7, the members 50 and 95 are held in alignment by four posts 145 extending upwardly which are pressed into downwardly extending bosses 146 of the member 95 and slidably mounted in upwardly extending bosses 147 on the member 50, bosses 146 and 147 having aligned bores. Thus, the upper and lower frame members are held accurately in alignment by the posts, but the upper member may be raised and lowered with respect to the lower member.

In order to limit the downward movement of the posts 145 in the bosses 147 and thus to determine accurately the desired lower position of the frame member, adjustable stops, comprising set screws 148, are threaded into the lower portions of the bores of the bosses 147. The upper ends of the set screws 148 engage and support the ends of the posts 145 as shown particularly in Figure 6, and the set screws may be locked in the desired position of adjustment by lock nuts 149.

In service, the set screws 148 are adjusted to a point at which the frictional engagement between the intermediate driving wheels 82 and 83 and the friction wheels 84 and 85 is sufficient to provide adequate driving force for the carriage without substantial slippage in directions parallel to the planes of the wheels 84 and 85, but at the same time, not great enough to impose undue resistance to slippage of the wheels 82 and 83 across the faces of the wheels 84 and 85. Proper driving engagement can be obtained readily with intermediate driving wheels composed of fairly hard rubber or the like and with wheels 84 and 85 preferably made of a metal such as hardened steel, with axially extending serrations on their driving faces as shown at **84*a* and 85*a***. The serrations prevent slippage circumferentially of the wheels, while transverse slippage can take place as easily as with a smooth-faced wheel.

In order to cushion the downward movement of the upper carriage member 95, I employ springs 150, surrounding the posts 147, the ends of the springs engaging the horizontal end faces of the opposed bosses 145 and 146.

To provide a conventient means for raising the upper frame member and thus disengaging the wheels 82 and 83 from the wheels 84 and 85, pairs of links 151 and 152 are pivoted at opposite sides of the lower frame member 50 and upper frame member 95, respectively. The ends of these links are connected as shown particularly in Figures 6 and 7 by intermediate links 153, the total length between the pivot points of each set of links 151, 152 and 153 being greater than the straight line distance between the points of connection of the links 151 and 152 to the frame members 50 and 95 when the frame member 95 is in lowered position so that rotation of the intermediate link in the direction to bring the pivot points into alignment will raise the upper frame member 95.

The links 153 are preferably rotated to raise and lower the upper frame member 95 by means of pairs of parallel links 154 and 155, the ends of which are pivotally mounted on a collar 156 supported in a bearing **156*a* on the carriage member 50 and slidable on a square shaft 157, the ends of which are supported by the end frame members 28 of the sub-frame 27 (see Figures 3 and 8). Opposite ends of shaft 157 are provided with handles 158 within easy reach of the operator of the machine. Angular movement of the handles in the direction of the arrow in Figure 7 will raise the upper member 95 through the action of the shaft 156, links 154 and 155, and the intermediate links 153, acting on links 151 and 152. The arrangement is such that the links 153 may be rotated slightly beyond the point required to bring all of the pivot points in direct alignment, in which position the upper link 154 engages the rod 156, thereby preventing further rotation of the rod, further movement of links 154 and 155 and further rotation of the intermediate links 153**, thus locking the upper frame member in raised position.

With the upper frame member in raised position, the drive wheels 82 and 83 are disengaged from the wheels 84 and 85, and the tracer 77 is disengaged from the pattern. Thus the carriage can be moved freely in any direction, and patterns can be replaced or moved on the pattern support without difficulty. When the upper frame member is lowered, the intermediate drive wheels 82 and 83 engage the friction wheels 84 and 85 with the proper amount of force as determined by adjustment of the set screws 148 and the tracer point 77 engages the pattern 26, thus placing the device in condition for operation.

*Automatic line follower control*

As noted above, the steering motor 76 is controlled to steer the carriage in such a manner that the tracer point 77 will move along the contour C of the pattern 26 with a predetermined amount of overlap maintained between the tracer point and the contour. This result is preferably accomplished by employing a conductive pattern and controlling the steering motor by variations in the flow of current between the pattern and the tracer, the circuits being arranged to steer the carriage to maintain the flow of current between pattern and tracer substantially constant. According to the forms of the invention disclosed in the present application, this may be accomplished either by a circuit responsive to changes in the resistance to flow of current between the tracer point and the contour or pattern, or in another form wherein the tracer point is vibrated in a direction substantially transversely of the contour, by a circuit responsive to changes in the point in the vibratory cycle of the tracer point at which the tracer point makes and breaks contact with the conductive contour. The resistance method embodying the tracer point shown in Figure 12 and the electrical circuits shown in Figure 14 will be first described.

A preferred tracer point construction is illustrated in Figure 12 as comprising a member 160 composed of insulating material and suitably secured to the shaft 78 of the steering motor 76 and constituting, in effect, an extension of that shaft. This member 160 carries two slip rings 161 and 162 engaged by brushes 163 and 164 which are supported by a block of insulating material 165, which in turn is carried by the lower frame member 50 of the carriage 31. A pin 166 coaxial with the shaft 78 is pressed into the block 160 and supports another cylindrical insulating block 167 which is also coaxial with the pin and motor shaft. The upper end of the block 167 carries a brass ring 168, and a contact ring 169 is slidably mounted on the lower end of the block; the ring is urged downwardly by the spring 170 which surrounds the block 167 and is prevented from being pushed off of the block 167 by the inwardly extending flange 171 which engages the shoulder 172. The contact ring 169 is connected to slip ring 162 through the spring 170, brass ring 168 and conductor 173.

The tracer point 77 is slidably mounted in the block 167, being slightly offset from the center of the block as shown. The tracer point 77 has a head 175 which operates in an enlarged recess 174 in the block 167; the spring 176 disposed within the enlarged recess urges the tracer point down into engagement with the pattern. The upper end of the spring engages a metal plug 177 pressed into the end of the recess, and the electrical connection between the tracer and the slip ring 161 is made through the spring 176, the plug 177 and conductor 178 which extends within the insulating block 160.

As shown in Figure 13, the contact ring 169 engages the contour C near the point of engagement of the tracer point 77 with the contour. The control circuit is arranged to control the steering motor in response to variations in the resistance to flow of current between tracer point and contact ring, which variations are caused by changes in the resistance to flow of current between the tracer point and contour, the changes in resistance resulting from changes in the amount of overlap between tracer point and contour. The distance between the contact ring and the tracer point, and the resistance of the contour C are such that the slight variations in distance along the contour between the tracer point and the contact ring, which may take place as the tracer travels along the contour, do not make a sufficient change in the resistance of the circuit as compared to the changes in the contact resistance between tracer point and contour due to variation in the amount of overlap between tracer and contour to be of sufficient consequence to be reflected in the control.

The control of the steering motor is preferably accomplished by the circuit arrangement shown in Figure 14 wherein the various components are illustrated diagrammatically (in order to simplify the diagram, the filament circuits are not shown in this figure or in Figure 18), the same reference characters being applied to components of the driving and steering mechanisms, such as the motors, spindles, driving wheels and the like, and to the tracer point and contact ring as were used in the previous description. Thus, the driving wheels 82 and 83 of the spindles 80 and 81 are driven at substantially constant speed by the driving motor indicated at 75 and embodying an armature 75*a* and field 75*b*, the mechanical connections between the motor and the spindles being indicated by broken lines.

Similarly, the spindles 80 and 81 are steered by the steering motor 76 embodying armature 76*a* and fields 76*b* and 76*c*, the fields being wound so that when one field is energized, the steering motor will rotate in one direction, and when the other field is energized, the steering motor will rotate in the opposite direction. The connections between the steering motor and the spindles 80 and 81 and the tracer point 77 are indicated by broken lines, the arrangement, as previously described, being such that the spindles and tracer point are rotated simultaneously by the steering motor so that the planes of the driving wheels 82 and 83 are always parallel to a plane passing through the center of the tracer point and the axis about which the tracer point is rotated.

A portion of the contour C to be followed by the apparatus is shown in the drawing as being engaged by the tracer point 77 and the follower ring 169. The contour C may comprise a heavy line drawn with a graphitic ink on paper, whereas the tracer 77 may have a rounded hardened steel point. Thus, varying amount of overlap between the tracer and the line causes a corresponding change in the point-to-contour conductivity. In a preferred form of the invention, the materials are such that the point-to-contour resistance changes from about 5000 ohms at full contact to infinity at no contact over a distance of a few thousandths of an inch. The changes in area of contact produce a gradient in conductivity, and the circuit is so arranged that when the point-to-contour resistance exceeds a predetermined amount, the steering motor is energized to steer the carriage and tracer point in toward the center of the pattern to increase the amount of overlap, and when the resistance is less than a predetermined amount, the other field of the steering motor is energized to rotate the steering motor in the opposite direction to steer the tracer point and carriage in the opposite direction, thereby to reduce the amount of overlap between the point and contour.

While, as noted above, this change in resistance is preferably provided by employing a metal point having a relatively low resistance in combination with the line composed of a relatively high resistance material such as graphite on a non-conductive background, it will be appreciated that a metallic pattern, such as a thin metal foil on non-conductive background, may be employed in conjunction with a tracer point composed of graphite or other suitable material having a relatively high resistance, which will also give the desired variations in conductivity with variations in the point and contour overlap.

Essentially, the control of the steering motor is accomplished by making the point-to-contour circuit an element of a phase selective bridge which controls the firing of two electronic tubes, one tube controlling the energization of the motor for rotation in one direction, the other tube controlling the energization for rotation in the opposite direction. In the present example, each tube supplies the energization of one of the motor fields. With the point-to-contour resistance below a predetermined value, one field predominates; with the resistance above that value the other field predominates, and when the resistance equals the predetermined value, i. e., at the null point, both fields are energized substantially equally.

Assuming the main power control switch 180, the manual starting control switch 181 and the starting relay 182 to be closed, energy is supplied to the steering motor 76 from the A. C. power supply lines 183; the steering motor is energized through the power supply transformer 184 and the control currents are supplied through the control transformer 185, the primaries 186 and 187, respectively, of these transformers being connected in parallel across the main power supply line.

The phase selective bridge comprises the secondary 188 of the transformer 185 across which is connected a potentiometer 189 having its sliding contact 190 connected at point 191 to the end of the three series resistors 192, 193 and 194, which are substantially equal in resistance, and resistor 194 being connected at point 195 to one end of potentiometer 189 and secondary 188. Resistors 192 and 193 have their common terminal 196 connected through the phase shift bridge 197 and the damping net work 198 to the cathodes of thyratrons 199 and 200 which control the energization of motor fields 76*b* and 76*c* to cause rotation of the armature 76*a* in the desired direction.

The grids of thyratrons 199 and 200 are connected to points 191 and 201 at the ends of resistors 192 and 193, respectively. Point 201 also is connected to the tracer point 77, while point 205 at the end of potentiometer 169 is connected to the contact ring 169. By this arrangement the grids of the thyratrons reverse in phase relative to their center point 196 as the tracer and template change from a condition of no contact and infinite resistance to complete contact and a resistance of, for example, 5000 ohms. This action may be explained by assuming that transformers 184 and 185 are phased so that potential measured from point 195 toward point 205 is negative with reference to the plate voltage on the thyratrons 199 and 200. At open circuit, with the tracer point 77 out of contact with the contour C, the three resistors 192, 193 and 194 are connected across the section of the potentiometer between sliding contact 190 and point 195. The voltage drop through this portion of the potentiometer may be, for example, 18 volts as marked on the drawing, and this voltage will be about equally distributed on the three resistors 192, 193 and 194. The point 196, therefore, will be about 12 volts negative with respect to point 195, while point 201 will be 6 volts negative with reference to point 195, and point 191 will be 18 volts negative with reference to point 195. Thus, with reference to the grid center point 196, point 201 will be 6 volts plus, and point 191 will be 6 volts minus. Under such conditions, the tube 200 will fire while the tube 199 will be held non-conductive by the negative potential applied to its grid. Firing of tube 200 will energize the circuit through field 76*c* causing the armature 76*a* of the steering motor 76 to rotate in a direction to steer the carriage and rotate the tracer to increase the amount of overlap between tracer and contour, i. e., in the example shown in the drawing with the tracer traveling along the contour in the direction indicated by the arrow, the motor will operate to turn the tracer point and the spindles 80 and 81 clockwise.

In the opposite condition, that is, with the maximum overlap and minimum resistance between tracer and contour, the full secondary voltage, except for the drop due to the point-to-contour resistance, will be across resistor 194. Resistors 192 and 193 will be connected across the section of the potentiometer between the slider 190 and the point 205, the voltage across this portion of the potentiometer being, in the example given, about 12 volts as marked on the drawing. Inasmuch as the point 205 at the negative end of the potentiometer is connected to the point 201, and the slider 190 is connected to the point 191, the conditions will be reversed as compared to the previous example, and point 201 will have a potential of minus 6 volts with respect to the center point 196, whereas point 191 will have a potential of plus 6 volts with respect to the center point 196. Under these conditions, tube 199 will fire while tube 200 will either be held non-conductive or fire very late in the half cycle depending upon the amplitude of the control voltage, current will flow through the field 76*b* of the motor and the motor armature 76*a* will rotate in a counterclockwise direction, decreasing the amount of overlap between the tracer and the contour.

As the amount of overlap decreases from maximum, the increasing point-to-contour resistance will reduce the positive voltage applied to the grid of tube 199, and the voltage applied to the grid of tube 200 will become less negative. Tube 199 will thus fire later in the positive half cycles of plate voltage applied to it, and tube 200 will begin to fire late in the positive half cycle of its plate voltage or to fire earlier if it had been firing toward the end of the half cycle, until the null point is reached when both tubes will fire for equal portions of the half cycle. The null point occurs when the resistance between the point and pattern becomes substantially equal to the resistance of resistor 194. Under such circumstances, the bridge will be balanced and both tubes will fire at about the same point in the same positive half cycle by reason of the voltage applied by the phase shift bridge 197.

The phase shift bridge 197 is employed to obtain a smooth application of power in the steering motor circuit, with the power substantially in proportion to the conductivity between the tracer point and contour, and hence in proportion to the amount of displacement of the tracer from the null point. The bridge 197, which comprises transformer 208, resistor 209 and condenser 210, is connected between the center point 196 and the cathode power supply line 211. This normally supplies to the grid control circuit a voltage lagging the plate voltage of the thyratrons by about 90 degrees.

The combination of the constant amplitude lagging voltage produced by the phase shift bridge 197 with the in-phase voltage produced by the phase selective bridge, produces a resultant voltage advanced with respect to the lagging voltage, the amount of advance depending upon the amplitude of the voltage produced by the phase selective bridge. Thus, in the extreme condition of no contact between tracer and contour or the extreme condition of complete contact between tracer and contour, the amplitude of the voltage produced by the phase selective bridge will be such that thyratron 199 or thyratron 200, as the case may be, will fire throughout substantially all of the positive half cycle of its plate voltage. As the amplitude decreases, the tube will fire at a later point in the cycle, resulting in the application of less power to the motor, and the control voltage of the non-firing tube will approach the critical voltage more closely. At the null point, where substantially no voltage is applied by the phase selective bridge, both tubes will fire as a result of the voltage applied by the phase shift bridge 197, but as this voltage lags the plate voltage by about 90 degrees, the tubes will fire only in the latter part of the positive half cycles of plate voltage.

Inasmuch as both tubes fire on the same positive half cycle, under such conditions fields 76*b* and 76*c* will both be energized. Theoretically, these fields should balance each other so that there should be no resultant motion of the motor when the tracer is at the null point. Practically, null conditions exist only momentarily, the normal response of the motor being a continuous succession of small adjustments to a null from which there is an immediate departure because of further movements of the tracer. Thus, there is a slight vibration of the motor under conditions which approach the null, but this vibration is so slight and the net power developed by the motor is so small, that there is substantially no motion transmitted either to the tracer point or to the spindles 80 and 81 when the tracer is following a straight line. If desired, a resilient connection, such as the rubber ring 110*a* in the sprocket 110, may be interposed between the steering motor and spindles 80 and 81 to absorb slight successive adjustments that cancel out and require no corresponding movement of the spindles. Such a resilient connection will not effect the response of the device as it follows a curve, or under any condition requiring a substantial correction.

It is to be noted that a correcting impulse is supplied to the motor during each cycle of the applied current; thus, with the usual A. C. power supply there is a correction, if one is required, 60 times a second. Thus, corrections are made so frequently and with so little intervening travel of the carriage, that no large deviations from the null are permitted to occur, whether the tracer is following a straight line or a curve.

As noted above, with a rounded point, hardened steel tracer and a heavy graphite line on paper, the point-to-contour resistance varies from infinity at no contact to about 5000 ohms at full contact. It is desirable that the relationship between the point-to-contour resistance and the resistance of the resistor 194 be such that the null point, where these resistances are equal, will occur in a zone where the point-to-contour resistance varies at a reasonably uniform rate for given changes in overlap. I have found satisfactory results to be obtainable with 30 volts across the potentiometer 189 and with the resistors 192, 193 and 194 all having resistances of approximately 100,000 ohms. Such a circuit balances when the point-to-contour resistance is approximately 100,000 ohms; with a point and contour of the character described, this resistance corresponds to a point and contour overlap of approximately 5 thousandths of an inch. This arrangement gives a smooth control whereas, for example, if the resistance of the resistors 192, 193 and 194 were as much as a megohm, for example, the effect would be similar to off-on control, and the throttling effect of the varying point-to-contour resistance would be lost; such a control would not be as smooth as the preferred form and would be subject to difficulties because of hunting. Conversely, if the resistance of the resistors 192, 193 and 194 is made too low, as compared to the minimum point-to-contour resistance, then the control will lose sensitivity, and the tracer will wander over the contour with a considerable loss in accuracy, and the currents flowing through the phase selective bridge and the pattern will be greater than necessary. Obviously, the resistances used must be governed by the resistance characteristics of the tracer and template materials.

The varying conductivity in the point-to-contour circuit tends inherently to eliminate oscillation in the steering motor and hunting of the control. However, to minimize further the hunting tendency inherent in most servomechanisms, I preferably employ the damping net work 198 in the thyratron cathode circuit. This net work comprises resistors 215 and 216 connected to the cathodes of thyratrons 199 and 200, respectively.

During conduction through either thyratron, a potential drop substantially greater than the critical grid voltage occurs across its cathode resistor. A corresponding charge is accumulated on condenser 217 which has the effect, upon subsequent discharge, of depressing or reducing the grid control voltage for the tube which has just fired; that is, the charge on the condenser makes the cathode of the tube which has just fired less negative with respect to its grid and hence has the effect of delaying the firing of the tube on the succeeding positive half cycle. For example, assume conditions to be such that tube 200 is conducting, the voltage drop across resistor 216 will produce the polarity indicated in the drawing, and a charge of corresponding polarity will appear on condenser 217. The charge on condenser 217 will not entirely dissipate during the immediately succeeding negative half cycle during which both thyratrons are non-conductive. The effect of the charge on the next positive half cycle is to depress the control voltage for tube 200 and elevate it for tube 199.

This effect is small in comparison to the control voltage impressed on the grids in response to a large deviation from the null point so that it does not seriously limit the rapid response of the control to conditions such as occur at a sharp turn. However, as the null point is approached and the control voltage created by the phase selective bridge approaches the critical voltage, the voltage of the condenser becomes effective to reduce the power transmitted by the tube which has been fired, and to place the tube which has not been firing in condition where a close approach to the null will result in an anticipatory correcting impulse. This feature of the control is particularly effective in stabilizing the adjustments for small deviations such as may occur as the tracer follows along a line that is substantially straight or smoothly curved.

The relationships between plate voltage, the lagging voltage produced by the phase shift bridge and the grid control voltages produced by the phase selective bridge are shown diagrammatically in Figure 15, in which diagram A shows the plate voltage $E_p$ on tubes 199 and 200, the critical grid voltage $E_c$ of the tubes and the voltage $a$ supplied by the phase shift bridge 197; diagram B shows the voltage $b$ between points 201 and 196 under conditions of no contact between point and pattern, and the voltage $c$ between points 191 and 196 under the same condition. Under these conditions, the grid voltage applied to tube 200 during each positive half cycle is the resultant of the voltages $a$ and $b$ and is indicated by the curve $a+b$ in diagram C. It will be noted that this voltage exceeds the critical voltage in the early part of the positive half cycle. Hence the tube 200 will fire and will be conductive throughout the major portion of each positive half cycle as indicated by the shading, so long as there is no contact between the point and the pattern. Under the same conditions, the voltage applied to the grid of tube 199 will be the resultant of voltages $a$ and $c$ shown at $a+c$ in diagram D. As there indicated, this voltage exceeds the critical voltage only in the latter part of each positive half cycle of the plate voltage. Hence tube 199 will fire late in the cycle, and very little power will be supplied to field 76*b*.

As the contact between point and pattern increases and the resistance decreases, the amplitude of voltages $b$ and $c$ gradually decreases. This results in firing of the tube 200 later in the cycle and tube 199 earlier in each cycle until the null point is reached when the phase selective bridge is balanced and the grid voltage on both tubes is the voltage $a$ produced by the phase shift bridge 197. Under these circumstances, both tubes will fire at about the mid-point of each positive half cycle of the plate voltage as indicated by the shading in diagram A, the power supplied to both field windings will be substantially equal, and the motor 76 will remain substantially stationary.

If the amount of overlap between point and pattern increases beyond the null point, then the curves $b$ and $c$ in diagram B are reversed in position and the effect on tubes 199 and 200 is reversed with tube 199 firing through a greater portion of the cycle than tube 200. When the point of minimum resistance is reached tube 199 will fire early in the cycle (as shown in diagram C for tube 200), and tube 200 will fire late in the cycle (as shown in diagram D for tube 199).

The effect of the damping network 198 is also shown in diagrams C and D of Figure 15. As described above, after the first half cycle of firing for either tube, the damping circuit has the effect of reducing the grid voltage applied to that tube. Thus, as the charge on the condenser 27 builds up, the curve $a+b$ which is the grid voltage of tube 200 will, in effect, be moved downwardly to the position shown in dotted lines, thus delaying the firing of the tube 200. At the same time the grid voltage applied to the tube 199 will be made less negative, having the effect of raising the voltage $a+c$ as indicated by the dotted line curve in diagram D, thus advancing the time of firing of the tube 199. The result, therefore, is to slow down the correcting movements of the steering motor as the correction is being completed, thus preventing over-shooting and hunting, yet the control does not diminish the power initially supplied to the motor in response to a change in point-to-contour resistance; thus, corrections are made promptly and with ample power. Obviously, the effects of the damping circuit will be reversed when tube 199 fires early in the cycle and tube 200 fires late, as occurs when the overlap between point and pattern exceeds the null point.

*Starting control*

In starting the apparatus, it is desirable to begin the cut away from the pattern and proceed in a straight line to the contour to be followed. This mode of operation requires that the steering motor be inoperative until the tracer contacts the contour, for reason that if the steering motor were operative it would tend to continuously rotate in a clockwise direction, in the embodiment shown in the drawing, so long as the tracer remained out of contact with the contour.

To accomplish this result, as well as to control the starting of the drive motor 75 and the application of the high pressure oxygen, I employ the double pole manual starting switch 181, the magnetic contactor 182 and thyratron 220. Assuming the main line switch 180 to be closed, closing of the switch 181 completes the circuit through contacts 221, thus completing the power supply to the driving motor through a speed control circuit to be described below, and energizing the solenoid valve 222 which opens to supply high pressure oxygen to the torch 36. Before the switch is closed, the spindles 80 and 81 are turned to point the intermediate driving wheels 82 and 83 toward the contour. This may be done with the intermediate wheels in contact with the wheels 84 and 85, or raised out of contact with them by the handle 159 and associated mechanism. With the intermediate wheels in raised position, the carriage easily can be moved to any desired starting position. When the switch 181 is closed, the drive motor moves the carriage toward the contour, which movement continues in a substantially straight line until the contour is reached, whereupon the automatic contour following control is placed in operation.

The automatic control is initiated through the thyratron 220 and the magnetic relay 182. So long as the relay 182 is not energized, the circuit through the contacts 223 remains open, thus no power is supplied to the cathode supply conductor 211 for the thyratrons 199 and 200 and no power can be supplied to the steering motor 76. The circuit is arranged so that thyratron 220 remains non-conductive until the tracer touches the contour. This is accomplished by connecting the grid of thyratron 220 to point 191 through the grid resistor 224, the power supply for the thyratron 220 being supplied by the secondary 225 of transformer 185 through the coil 226 and contacts 227 of the magnetic contactor 182 and the contacts 228 of the manual contactor 181, the lead from contacts 228 extending to the point 196. So long as the tracer is out of contact with the contour, point 191 is negative to point 196 as previously described, and accordingly, the tube 220 is held non-conductive. However, as soon as the tracer touches the contour and makes sufficient contact with it to reduce the point-to-contour resistance to a value such that point 191 is negative with respect to point 196 by an amount less than the critical voltage of the tube 200 (the critical voltage ordinarily being about minus 3 volts), the tube 220 will fire, operating relay 182. The contacts of the relay are thus closed as, or slightly before, the tracer reaches the null point on the contour and after the tracer is in contact with the contour. Movable contact 229 of relay 182 first closes the circuit through contact 230 and then opens the circuit through contact 227. Thus, the movable contact 229 cuts out the cathode of thyratron 220 and renders it ineffective immediately after the holding circuit through resistor 231 has been completed. At the same time, the circuit through contacts 223 is completed, thus putting the automatic control of the steering motor into operation, and this control will be maintained until the manual switch 181 is opened, at which time the relay 182 will drop out, the driving motor will stop and valve 222 will close, thus resetting the starting control for another operation.

*Drive motor speed control.*

In order to secure uniformity of action of the cutting torch, it is desirable that the speed of movement of the torch over the work be maintained at a substantially constant value, say within five percent. It is also necessary to vary the speed for different thicknesses of work, different materials, different gas pressures and the like. To permit reasonably wide adjustments in speed of the driving motor and at the same time accurately to maintain the desired speed, I preferably employ the drive motor speed control circuit shown in Figure 14 of the drawings and comprising the rectifier 235 connected across the A. C. supply line 183 and maintaining a substantially constant voltage across the potentiometer 236, the voltage being subject only to fluctuations in line voltage. A relatively large filter condenser 237 is also connected across the potentiometer. The field 75*b* of motor 75 is separately excited by connection through rectifier 238 to the A. C. power line when the contacts 221 of the manual starting switch 181 are closed. At the same time, the armature 75*a* is energized by current flowing through the thyratron 239, a reactor 240 being connected in series in the thyratron circuit to limit the current flow. The grid of thyratron 239 is connected through a resistor 241 to the sliding contact 242 of potentiometer 236.

When the tube 239 is conductive, the polarity across the armature will be as indicated in the drawing. It will be apparent that if the armature voltage is below the voltage on the potentiometer between the point 243 and the sliding contact 242, the grid will be held plus by the difference between the voltages. If the armature voltage is above that value, the grid will be held minus by that difference. Thus, conduction of the tube 239 will be stopped when the armature voltage exceeds the voltage between point 243 and slider 242 by an amount just in excess of the critical voltage of the tube. Whenever there is a positive grid, the tube 239 will be fully conducting, giving maximum torque at any speed.

The field excitation is substantially constant so that the armature voltage is nearly proportional to its speed. Thus, by moving the slider on the potentiometer, a corresponding change in speed can be obtained and the potentiometer can be calibrated in inches per minute of travel of the carriage.

The motor speed is maintained substantially constant inasmuch as an increase in line voltage causes the strengthening of the motor field and at the same time an increased voltage on potentiometer 236. Conversely, a decrease in line voltage decreases the strength of the motor field and decreases the voltage on the potentiometer. These changes in line voltage and potentiometer voltage tend to counteract each other insofar as the speed of the motor is concerned. Hence, ordinary fluctuations in line voltage do not substantially affect the motor speed.

The knob 244 shown on panel 54′ (Figure 2) controls the potentiometer and provides manual control of the motor speed. The controls are such that the operator has only to set the motor speed control at the desired value, light his torch to start his cut a small distance away from the contour to be followed, adjust the wheels 82 and 83 so that they point toward the contour preferably in such a manner that the tracer will intersect the contour obliquely, and then, when the work has been preheated sufficiently, close the switch 181 (which is also mounted on panel 54′), thereby starting the drive motor and turning on the high pressure oxygen. The carriage will then proceed in a substantially straight line until it reaches the contour when it will automatically follow the contour at a substantially constant speed until the operator opens the switch 181. When the switch 181 is opened, the drive motor will stop and the high pressure oxygen will be shut off, thus stopping the cutting action.

*Automatic control embodying a vibrating tracer*

Instead of the tracer and control circuit just described, I may utilize an arrangement in which the tracer point is vibrated across the contour transversely of the direction of movement of the carriage. In this type of apparatus, the desired throttling effect and stability of operation are obtained not by variations in the point-to-contour resistance as in the case of the previously described form of the invention, but by changes in the time in the cycle of vibration of the tracer point at which substantial contact with the contour is made or broken. This type of control does not depend upon variations in point-to-contour resistance for different amounts of overlap and hence can be employed with metal patterns on non-conductive base or background materials; for example, thin foil patterns on paper may be used with metal tracer points. The high resistance contour and tracer point combinations heretofore described may also be employed with this circuit, however.

The vibrating tracer point control may be used with the carriage previously described, the only change required being in the support for the tracer point, which, as shown in Figures 16 and 17, comprises a cylindrical block 245 secured to the shaft 78 of steering motor 76 as by a set screw or other convenient means. This block supports slip rings 246, 247 and 248 engaged by brushes 249, 250 and 251, respectively, and at its lower end supports a plate 252 composed of insulating material to which the oscillating motor 253 is secured by means of screws 254 and 255 and plates 256. The motor preferably is of the type described in my issued Patent No. 2,351,623, issued June 20, 1944, and embodies a field structure 257 and a pivoted armature 258. As described in my said patent, motors of this type vibrate in synchronism with the frequency of the applied current rather than at twice the frequency of the applied current as is customary with ordinary vibrators. Motors made according to my patent ordinarily embody two salient pole faces. For the present purposes, one of the pole faces of the field structure is cut away, leaving only the salient pole face 259. For reasons which will appear below, the current supplied to the motor is put through a half wave rectifier, and with the arrangement shown, each half cycle applied to the motor will attract the armature toward the pole face 259.

The armature is pivoted to the field structure as at 260; the pivot pin 261 extends beneath the armature structure and supports a lever 262. Near one end of the lever 262 there are two upwardly extending pins 263 which are disposed on opposite sides of a fiber plate or vane 264 projecting from the rear end of the armature 258; vibration of the armature thus vibrates lever 262. The other end of lever 262 carries the tracer 265 which is urged downwardly by a spring 266 within the housing 267. The tracer is slightly offset from the center line of the shaft 78; the motor is arranged to vibrate the tracer in directions across and substantially normal to a line extending from the axis of shaft 78 to the mid-point of the travel of the tracer.

A conductor ring 268 surrounds the tracer and is supported by a spring member 269, the member 269 being supported by the insulating member 270 which also supports the brushes 249, 250 and 251. The member 270 is supported from the bottom frame member 50 of the carriage. Power to operate the oscillating motor 253 is supplied through suitable conductors leading to the brushes 249 and 250, through them to collector rings 246 and 247 and thence to the motor through suitable conductors extending within the insulating block 245. The circuit to the tracer is through the brush 251, collector ring 248, and a conductor leading to the motor 253 on which the tracer is conductively mounted through pivot 261, lever 262 and spring 266. The circuit to the ring 268 is through the spring 269 and a suitable conductor secured thereto.

The steering motor control circuit for a device embodying the vibrating tracer is shown in Figure 18. In this figure, the starting control and the drive motor speed control are the same as previously described, and the same reference characters have been applied to these components as were used in the description of Figure 14. The steering motor is the same as previously described, consisting of the armature 76*a* and fields 76*b* and 76*c*, the energization of the fields being controlled by thyratrons 200 and 199 as before.

The arrangement is such that energization of the field 76b by the tube 199 will result in rotation of the motor armature 76a and shaft 78 in a counterclockwise direction, and a decrease in the amount of overlap between the tracer and the contour; whereas energization of the field 76c through the thyratron 200 will result in an increased overlap between tracer and contour. This is accomplished through a bridge circuit arranged to fire the tubes 200 and 199 in accordance with the point in the cycle of vibration of the tracer at which the circuit between the tracer and the contour is made and broken.

The circuit includes the transformer 275 which supplies power for the operation of the motor 76. In this form of the invention, it will be noted that the transformer embodies two secondaries phased so that the voltages on the thyratrons 199 and 200 are 180° apart with reference to their common cathodes. The control voltages are furnished through the transformer 185 as before with potentiometer 189 connected across the secondary 188. However, in this form of the invention, the bridge circuit includes two resistors 277 and 278, the intermediate point 279 being connected to the cathodes of the thyratrons and the end point 280 being connected to the grids of the thyratrons. Point 205 of the potentiometer is connected to the ring 268, and the tracer 265 is connected to the point 279. The resistance of resistor 278 should be about twice that of resistor 277 with the voltages shown across potentiometer 189, to obtain approximately equal amplitudes of grid control voltage for contact and no contact.

Assuming that there is no contact between tracer 265 and the contour C′ and that the transformer 185 is phased with respect to transformer 275 so that the voltage across resistor 278 is negative with reference to the voltage on the thyratron 199, then point 280 will be negative to point 279 during the positive half cycle applied to the plate of thyratron 199. Accordingly, this negative voltage on the grid will hold the tube 199 non-conductive. At the same time, tube 200 will be non-conductive because its plate voltage will then be in the negative half cycle. It will be observed that with this arrangement, when the tracer is in contact with the pattern, the resistor 277 is shunted across the secondary 188 of the transformer 185, and point 279 is brought to substantially the same potential as point 205. Thus, the phase relationship of point 280 to point 279 will be opposite to that in effect during no contact. Accordingly, the phase selective bridge reverses the effect of the control voltage impressed on the grids as the follower point passes from a zone where there is no contact with the contour to a zone where the contact between the tracer and the contour is sufficient to balance the bridge so that the negative potential applied to the thyratron grids is less than the critical voltage of the thyratrons.

The tracer is vibrated in synchronism with the applied voltage by the oscillating motor 253, the field 285 of which is energized from the main power supply line 183 through the half wave rectifier 286. The flux induced in the armature 258 of the motor which drives the tracer 265 across the contour lags the supply voltage by 90°, the motion of the armature being closely in phase with the flux. Field 285 is connected so that the tracer approaches the contour during the positive half cycle on tube 199. Thus, during the positive half cycle applied to tube 199, the tracer makes a complete swing or half cycle from its position farthest away from the contour to its position nearest the contour or with the greatest degree of overlap, and makes its complete swing in the opposite direction during the positive half cycle applied to the tube 200. Tube 199, which controls the motion of the tracer away from the pattern, fires when the tracer makes contact with the pattern sufficient to balance the bridge. Tube 200, which controls the motion of the tracer toward the pattern, fires when the tracer breaks contact with the pattern sufficiently to unbalance the bridge.

The diagrams constituting Figure 19 show the relationship between the various voltages and the motion of the tracer with respect to the contour. Diagram A illustrates the positive half cycles of the power supply voltage on the plates of tubes 199 and 200. The negative half cycles are not illustrated as they do not play any part in the operation of the tubes.

The voltage across resistor 278, which determines the voltage applied to the grids of the thyratrons 199 and 200, is illustrated in diagram B. The full line curve shows the voltage for no contact, while the broken line curve shows the voltage for such contact as will make the resistance between point and pattern negligible with respect to the resistance of the bridge. (The curve for less than full contact would have smaller amplitude than the broken line, but the tube will fire whenever this curve exceeds the critical voltage.) The change from the condition of no contact to contact occurs very rapidly as the tracer passes from the non-conductive base to the conductive pattern, and this is true even though the pattern be composed of a high resistance material such as the graphite line previously described. If the pattern is composed of metal, then the contact condition occurs immediately adjacent the edge of the pattern. If the contour is composed of a graphite line or other high resistance material, or if a high resistance point is employed with a metal or other pattern, then the contact condition occurs when the tracer point has moved a few thousandths of an inch inwardly across the edge of the pattern.

The effect of the change from no contact to contact is shown in diagram C. As there indicated, the passage of the tracer into contact with the contour immediately reverses the relationship of the grid control voltage to the critical voltage of tube 199, the control voltage changing from the form of curve $x$ of diagram B to the form of curve $y$ so that the tube fires, in the example shown, for the last half of the positive half cycle of the plate voltage on the tube. Diagrams B and C show the grid voltage as it is when the point-to-contour resistance changes from an infinite value to a negligible value. Obviously, it is not necessary that the change go through this complete range so long as the change is sufficient to reverse the relationship between the grid voltage and the critical voltage, so that before the tracer crosses the critical point on the contour the grid will be sufficiently negative to hold the tube non-conductive, and after the tracer crosses that point, the negative voltage applied to the grid will be reduced enough to permit the tube to conduct.

Diagram D shows the change in the grid control voltage that occurs upon movement of the tracer from contact to no contact as related to the firing of tube 200. The diagram is similar to diagram C, and no explanation of it is believed necessary. The shaded portions in the diagrams indicate the part of the cycle during which the tubes are conductive.

Diagram E illustrates a complete cycle of movement of the tracer point from its extreme off-the-contour position to its position of greatest overlap and back to its extreme off-the-contour position. In this diagram the interception of tracer and contour occur substantially at the mid-point of the swing of the tracer. With the tracer in position *a* out of contact with the contour, the grid voltage is negative corresponding to voltage *x* of diagram B, and the tube 199 is non-conductive. When the tracer makes contact with the contour as at *b*, the grid voltage becomes positive, corresponding to the voltage *y* of diagram B, thus firing tube 199 which tends to steer the tracer away from the contour. Tube 199 remains conductive throughout the remainder of positive half cycle applied to it. During this first positive half cycle, tube 200 is non-conductive because its plate voltage is 180° out of phase with the voltage applied to tube 199, and hence is negative. As long as the tracer remains in contact with the contour as in position *c*, the grid voltage corresponds to the "contact" voltage *y* shown by the broken line. When the tracer leaves the contour as at position *d*, the grid voltage is changed from negative to positive and corresponds to the "no contact" voltage *x*.

Thus, during the second half cycle when a positive half cycle is being applied to tube 200, the grid of tube 200 is held negative so long as the tracer is in contact with the pattern, but when the no contact position at *d* is reached, the grid becomes positive and tube 200 fires and remains conductive until the completion of the positive half cycle applied to it as shown by the shaded portion of the curve. During this period, the tube 199 is non-conductive because its plate voltage is negative. Thus, with the tracer intercepting the pattern at about the mid-point of its swing, tubes 199 and 200 will each become conductive throughout substantially the last halves of the positive half cycles applied to them. The flow of current through tube 199 and field 76*b* tends to steer the tracer away from the pattern, i. e., to decrease the amount of overlap, while the flow of current through tube 200 and field 76*c* tends to steer the tracer toward the pattern, i. e., to increase the amount of overlap. These two effects are substantially equal, and because of the rapidity with which they follow each other, the inertia of the parts, and the resiliency provided in the drive, no substantial motion is transmitted to the tracer or to the spindles 80 and 81 from the steering motor. With this system, mechanically opposed correcting impulses are spaced in succession, not coincidence. The response is therefore continuously adjusting at twice the frequency of the power supply. In the "null" condition, or perhaps more accurately, the normally-held position, the correcting impulses are equal and opposite.

Diagram F shows the condition in which the tracer is too close to the pattern. Successive positions of the tracer are shown at *f, g, h, i, j, k,* and *l*. Here the tracer intercepts the pattern and changes from the no contact to contact condition early in the positive half cycle applied to tube 199 and leaves the pattern late in the positive half cycle applied to tube 200. Thus, tube 199 fires throughout the major portion of the half cycle applied to it, whereas tube 200 fires through only a minor portion of the positive half cycle applied to it. Accordingly, the action of field 76*b* will predominate and the steering motor will have a tendency to rotate in a direction to steer the tracer away from the contour and diminish the amount of overlap. As the amount of overlap diminishes, the predominance of current through tube 199 as compared to tube 200 is reduced, thus giving the desired throttling effect and providing a stable control in which the tendency to hunt is kept at a minimum.

Diagram G shows the condition when the tracer is too far away from the contour. The effect is just the opposite of that shown by diagram F; here the tracer, as shown by the positions *m, n, o, p, q, r* and *s*, is in the contact condition for only a small portion of its swing. Thus, tube 199 fires late in its positive half cycle, tube 200 fires early in its positive half cycle, and the forces tending to steer the tracer closer to the pattern predominate, thus correcting the error and bringing the tracer back to the normally held condition shown in diagram E. In this form of the invention, the damping network is omitted, because the effect of the vibrating point is inherently anticipatory. The amplitude of vibration of the point preferably is in the order of 0.070 inch; thus, as the tracer approaches the pattern, the vibrating point makes contact with the contour about 0.035 inch before arriving at the normally held position.

As noted above, the drive motor and steering controls for this arrangement are identical with those described with respect to Figure 14. The operation, so far as the operator is concerned, is identical and the description will not be repeated here.

With both types of controls, it is necessary to make some modifications of the contour with respect to the pattern to be cut. Thus, allowance must be made for the thickness of the cut, and inasmuch as the tracer point is mounted eccentrically with respect to the axis of the steering motor, the patterns must be modified for very sharp corners by extending the line on the contour approaching the corner slightly beyond the desired location of the corner. The necessary modifications of the pattern can be made readily by those skilled in the art.

It is to be noted that with both types of controls, the circuits are arranged to apply correcting impulses to the steering motor in accordance with the frequency of the alternating current supply. With the circuit of Figure 14, the correcting impulses are applied at the frequency of the supply current; with the circuit of Figure 18, the correcting impulses are applied at twice the frequency of the supply current. Because of the extremely short intervals between corrections, the deviations of the tracer from the contour never become large. For example, at a speed of 30 inches per minute, which is about the maximum ordinarily employed in torch cutting operations, the carriage will move at the rate of 0.5 inch per second. With the circuit of Figure 14 and 60 cycle current, there will be a correcting impulse every 0.0083 inch of carriage travel; with the circuit of Figure 18, the impulses come twice as fast. Thus, errors are corrected before they can become of any substantial size, and the tracer follows the contour without substantial deviation therefrom. If greater accuracy, or the same accuracy with higher operating speeds are desired, the frequency of the correcting impulses can be increased by increasing the frequency of the alternating current supply.

From the foregoing description of preferred forms of my invention, it will be seen that I have provided an apparatus for reproducing contours in which the electrical circuits are such that accuracy of operation is insured, and the mechanical construction is such that the accuracy of the electrical contour following apparatus is not impaired in transmission of movements of the tracer to the cutting tool. The apparatus is rugged and substantially foolproof. The electrical components in general are well known and readily available. The mechanical parts are of sturdy and simple design; hence, the apparatus can be built at reasonable cost and will operate accurately and without trouble for long periods of time. The operation of the apparatus is such that high quality work can be produced by operators of no particular skill or training.

Various changes and modifications may be made in the apparatus and method described herein without departing from the spirit and scope of my invention. Accordingly, it is to be understood that the foregoing description is given by way of example and not by way of limitation, and that my patent is not limited to the preferred form of the invention described herein or in any manner other than by the scope of the appended claims.

I claim:

1. In a contour reproducing apparatus having a main frame, a pattern support carried thereby, a sub-frame movable therealong in a straight line, a carriage mounted on the sub-frame and movable thereon in directions transverse to the movement of the sub-frame along the main frame whereby movements of the carriage on said sub-frame and of said sub-frame on said main frame enable the carriage to move over said pattern support in any direction, means for driving said carriage along a contour carried by said pattern support, said means comprising a tracer point on said carriage arranged to follow said contour and offset from and rotatable about an axis normal to said pattern support, a pair of driving spindles on said carriage, intermediate driving wheels on said spindles disposed in parallel planes normal to said pattern support, means for driving said intermediate driving wheels at substantially the same peripheral speed, steering means for steering said driving spindles and said tracer point to maintain the planes of said intermediate driving wheels and the plane passing through said tracer point and the axis about which it is rotatable parallel with the intended direction of movement of said carriage along said contour, a friction wheel engaged by one of said intermediate driving wheels and disposed in a plane parallel to the direction of movement of said sub-frame along said main frame, a second friction wheel engaged by the other of said intermediate driving wheels and disposed in a plane parallel to the direction of movement of said carriage along said sub-frame, whereby said first friction wheel is rotate at a peripheral speed corresponding to the component of the peripheral speed of the intermediate driving wheels in a direction parallel to the direction of movement of the said sub-frame along said main frame and said second friction wheel is rotated at a peripheral speed corresponding to the component of the peripheral speed of the intermediate driving wheels in a direction parallel to the direction of movement of said carriage along said sub-frame, and driving connections between said first friction wheel and said main frame and between said second friction wheel and said sub-frame, whereby said carriage is driven in a direction parallel to the planes of said intermediate driving wheels at a lineal velocity determined by the peripheral velocity of said intermediate driving wheels.

2. In a contour reproducing apparatus having a pattern support, a tracer rotatable about an axis normal to said pattern support and offset from said axis, means for driving said tracer along a contour carried by said pattern support, said means comprising a pair of driving spindles, intermediate driving wheels on said spindles disposed in parallel planes normal to said pattern support, means for driving said intermediate driving wheels at substantially the same peripheral speed, steering means for steering said driving spindles and said tracer to maintian the planes of said intermediate driving wheels and the plane passing through said tracer and the axis about which it is rotatable in a predetermined relationship with the intended direction of movement of said tracer along said contour, a friction wheel engaged by one of said intermediate driving wheels and disposed in a plane parallel to one component of the direction of movement of said tracer, a second friction wheel engaged by the other of said intermediate driving wheels and disposed in a plane parallel to the component of the direction of movement of said tracer at right angles to said first component whereby said first friction wheel is rotated at a peripheral speed corresponding to one component of the peripheral speed of the intermediate driving wheels and said second friction wheel is rotated at a peripheral speed corresponding to the component of the peripheral speed of the intermediate driving wheels in a direction at right angles to the first component, and driving connections between said friction wheels and elements extending parallel to the respective components, whereby said tracer is driven in a direction parallel to the planes of said intermediate driving wheels at a lineal velocity determined by the peripheral velocity of said intermediate driving wheels.

3. In a contour reproducing apparatus having a pattern support, a tracer, means for driving said tracer along a contour carried by said pattern support, said means comprising a pair of driving spindles, intermediate driving wheels on said spindles disposed in parallel planes normal to said pattern support, means for driving said intermediate driving wheels at substantially the same peripheral speed, steering means for steering said driving spindles to maintain the planes of said intermediate driving wheels parallel with the intended direction of movement of said tracer along said contour, a friction wheel engaged by one of said intermediate driving wheels and disposed in a plane parallel to one component of the direction of movement of said carriage, a second friction wheel engaged by the other of said intermediate driving wheels and disposed in a plane parallel to the component of the direction of movement of said carriage at right angles to said first component whereby said first friction wheel is rotated at a peripheral speed corresponding to one component of the peripheral speed of the intermediate driving wheels and said second friction wheel is rotated at a peripheral speed corresponding to the component of the peripheral speed of the intermediate driving wheels in a direction at right angles to the first component, and driving connections between said friction wheels and elements extending parallel to the respective components, whereby said tracer is driven in a direction parallel to the planes of said intermediate driving wheels at a lineal velocity determined by the peripheral velocity of said intermediate driving wheels.

4. In a contour reproducing apparatus, a carriage adapted to follow a contour to be reproduced, said carriage comprising means for supporting the carriage for movement over the contour, a driving motor, a steering motor having a shaft normal to the plane of said contour, the shaft of said steering motor projecting beneath the carriage and carrying an offset tracer point adapted to make contact with the contour, a driving spindle provided at its lower end with a wheel adapted to make frictional engagement with a member beneath it to drive said carriage, said spindle being rotatable about a vertical axis to steer said wheel, a one to one connection between said steering motor shaft and said spindle whereby said steering motor can steer said tracer and said spindle in unison, and a driving connection between said driving motor and said wheel.

5. In a contour reproducing apparatus having a supporting structure, a carriage mounted for movement with respect to said structure and adapted to follow a contour to be reproduced, said carriage comprising a lower body member provided with means for supporting the carriage for movement over the contour and driving means engaging said structure and embodying a pair of friction wheels mounted in said lower body member and disposed in planes at right angles to each other, an upper body member supported by the lower body member and movable vertically with respect thereto, a driving motor having a vertical shaft supported by said upper body member, a pair of driving spindles carried by said upper body member and provided at their lower ends with intermediate driving wheels disposed in parallel planes and adapted to make frictional engagement with said friction wheels to drive said carriage, said spindles being rotatable about a vertical axis to steer said intermediate driving wheels, driving connections between said driving motor and said intermediate driving wheels, and means for raising said upper body member with respect to said lower body member to lift said intermediate driving wheels out of frictional engagement with said friction wheels.

6. In a contour reproducing apparatus having a supporting structure, a carriage mounted for movement with respect to said structure and adapted to follow a contour to be reproduced, said carriage comprising a lower body member provided with means for supporting the carriage for movement over the contour, and driving means engaging said structure and embodying a pair of friction wheels mounted in said lower body member and disposed in planes at right angles to each other, an upper body member supported by the lower body member and movable vertically with respect thereto, a driving motor having a vertical shaft supported by said upper body member, a steering motor having a vertical shaft supported by said upper body member, the shaft of said steering motor projecting beneath the lower body member and carrying an offset tracer point adapted to make contact with the contour, a pair of driving spindles carried by said upper body member and provided at their lower ends with intermediate driving wheels disposed in parallel planes and adapted to make frictional engagement with said friction wheels to drive said carriage, said spindles being rotatable about a vertical axis to steer said intermediate driving wheels, a one to one driving connection between said steering motor shaft and said spindles for rotating said spindles whereby said steering motor steers said tracer and said spindles in unison, driving connections between said driving motor and said intermediate driving wheels, and means for raising said upper body member with respect to said lower body member to disengage said tracer from said contour and to lift said intermediate driving wheels out of frictional engagement with said friction wheels.

7. In a contour reproducing apparatus having a supporting structure, a carriage mounted for movement with respect to said structure and adapted to follow a contour to be reproduced, said carriage comprising a lower body member provided with means for supporting the carriage for movement over the contour and driving means engaging said structure and embodying a pair of friction wheels mounted in said lower body member and disposed in planes at right angles to each other, an upper body member supported by the lower body member and movable vertically with respect thereto, a driving motor supported by said upper body member, a steering motor supported by said upper body member, a shaft supported by said upper body member connected to said steering motor and projecting beneath the lower body member and carrying an offset tracer point adapted to make contact with the contour, a pair of driving spindles carried by said upper body member and provided at their lower ends with intermediate driving wheels disposed in parallel planes and adapted to make frictional engagement with said friction wheels to drive said carriage, said spindles being rotatable about a vertical axis to steer said intermediate driving wheels, a driving connection between said steering motor and said spindles for rotating said spindles whereby said steering motor can steer said tracer and said spindles in unison, driving connections between said driving motor and said intermediate driving wheels, and means for raising said upper body member with respect to said lower body member to disengage said tracer from said contour and to lift said wheels out of frictional engagement with said friction wheels.

8. In a contour reproducing apparatus, a carriage adapted to follow a contour to be reproduced, said carriage comprising a lower body member provided with means for supporting the carriage for movement over the contour, an upper body member supported by the lower body member and movable vertically with respect thereto, a driving motor supported by said upper body member, a steering motor supported by said upper body member, a shaft supported by said upper body member connected to said steering motor and projecting beneath the lower body member and carrying an offset tracer point adapted to make contact with the contour, a driving spindle carried by said upper body member and provided at its lower end with a wheel adapted to make frictional engagement with a member beneath it to drive said carriage, said spindle being rotatable about a vertical axis to steer said wheel, a driving connection between said steering motor and said spindle for rotating said spindle whereby said steering motor can steer said tracer and said spindle in unison, a driving connection between said driving motor and said wheel, and means for raising said upper body member with respect to said lower body member to disengage said tracer from said contour and to lift said wheel out of frictional engagement with the member beneath it.

9. In a contour reproducing apparatus, a carriage adapted to follow a contour to be reproduced, said carriage comprising a lower body member provided with means for supporting the carriage for movement with respect to the contour, an upper body member supported by the lower body member and movable vertically with respect thereto, a driving motor supported by said upper body member, a steering motor having a vertical shaft carrying an offset tracer point adapted to make contact with the contour, a driving spindle carried by said upper body member and provided at its lower end with a wheel adapted to make frictional engagement with a member beneath it to drive said carriage, said spindle being rotatable about a vertical axis to steer said wheel, a one to one driving connection between said steering motor shaft and said spindle for rotating said spindle whereby said steering motor can steer said tracer and said spindle in unison, a driving connection between said driving motor and said wheel, and means for raising said upper body member with respect to said lower body member to lift said wheel out of frictional engagement with the member beneath it.

10. The method of automatically following a contour composed of one material on a base composed of another material, one of said materials being conductive and the other non-conductive, which includes the steps of engaging the contour by a conductive tracer, propelling the tracer along the contour, establishing an alternating current electrical control circuit through the conductive material and tracer, vibrating the tracer across the contour in synchronism with the alternating current and in a direction substantially normal to its direction of movement, and automatically steering the tracer in accordance with variations in the points in the cycle of vibration of the tracer at which the tracer makes and breaks contact with the contour to maintain the overlap between tracer and contour substantially constant whereby steering impulses are applied at twice the frequency of the current.

11. The method of automatically following a contour defined by the juncture of a non-conductive material with a conductive material which includes the steps of engaging the contour by a conductive tracer, establishing an electrical circuit through the conductive material and the tracer, propelling the tracer along the contour, and steering the tracer in response to variations in the resistance between the tracer and the conductive material to decrease the amount of overlap between the tracer and the conductive material when said resistance falls below a predetermined value and to increase the amount of overlap between the tracer and the conductive material when said resistance exceeds said predetermined value, thereby to maintain said resistance at substantially said predetermined value and to maintain the overlap between the tracer and the conductive material substantially constant.

12. In a contour reproducing apparatus, means for following a contour comprising a conductive line on a non-conductive background, said means comprising a carriage, a tracer point mounted on the carriage and adapted to engage said line, said line and said tracer point being composed of materials such that the contact resistance between said line and tracer point is of the order of the resistance between a line composed of a graphitic ink on a paper background and a metal point whereby variations in the amount of overlap between said tracer point and line result in variations in resistance between said tracer point and line, means for driving said carriage, means for steering said carriage, and electric circuit means including said line and said tracer point for controlling said steering means to steer said carriage to decrease the amount of overlap between said tracer point and said line when the contact resistance therebetween falls below a predetermined amount and to increase the amount of overlap when the contact resistance exceeds said predetermined amount, whereby said carriage is steered to maintain the overlap substantially constant and thereby to follow said line.

13. An apparatus according to claim 12 wherein the contour comprises a graphite line on a non-conductive background, and the tracer point is composed of metal.

14. An apparatus according to claim 12 wherein the contour comprises an edge of a pattern composed of a thin layer of metal on a non-conductive background, and the tracer is composed of a material having substantially the electrical resistance of graphite.

15. An apparatus according to claim 12 wherein the tracer point is surrounded by a conductive metal ring which is adapted to make contact with said contour, and wherein the resistance of the circuit between said ring and said tracer point is utilized to control the steering of the carriage.

16. An apparatus according to claim 15 wherein the tracer point is rotatable about and offset from an axis substantially normal to the plane of the contour, and having means for connecting the steering means to the tracer point to rotate the tracer point about said axis, whereby a plane passing through said axis and the tracer point will lie paralled to the direction of movement of said carriage as determined by said steering means.

17. In a contour reproducing apparatus, means for following a contour comprising a conductive line on a non-conductive background, said means comprising a carriage, a tracer point mounted on the carriage and adapted to engage said line, said line and said tracer point being composed of materials such that the contact resistance between said line and tracer point is of the order of the resistance between a line composed of a graphitic ink on a paper background and a metal point whereby variations in the amount of overlap between said tracer point and line result in variations in resistance between said tracer point and line, means for driving said carriage, means for steering said carriage, and electric circuit means including said line and said tracer point for controlling said steering means to steer said carriage to decrease the amount of overlap between said tracer point and said line when the contact resistance therebetween falls below a predetermined amount and to increase the amount of overlap when the contact resistance exceeds said predetermined amount, whereby said carriage is steered to maintain the overlap substantially constant and thereby to follow said line, said electric circuit means including two thyratrons, the current flowing through one thyratron tending to steer the carriage to increase the amount of overlap between the tracer point and the line, and the current flowing through the other thyratron tending to decrease the amount of overlap between the tracer point and the line, the circuit also including a phase selective bridge arranged to impose a positive voltage in the grid circuit of said first mentioned thyratron when the resistance between the tracer point and the line is less than a predetermined amount, and to impose a positive voltage in the grid circuit of the second thyratron when the resistance exceeds said predetermined amount.

18. An apparatus according to claim 17 wherein a phase shift bridge is employed to apply a voltage to the grids of both thyratrons which lags the plate voltage thereof, the phase selective bridge supplying a voltage which is in phase with said plate voltage whereby the resultant voltage on the grids is advanced with respect to the output of the phase shift bridge an amount dependent upon the amplitude of the voltage supplied by the phase selective bridge.

19. An apparatus according to claim 17 wherein a damping network is provided in the cathode circuit of the thyratrons whereby following the firing of one of the thyratrons the next succeeding firing of that thyratron is delayed.

20. An apparatus according to claim 17 in which a damping network is provided, said damping network comprising resistors in series with the cathodes of both thyratrons, and a condenser connected across said cathodes, said condenser being charged during the firing of either thyratron, the discharge of said condenser acting to reduce the grid control voltage of the thyratron during the firing of which the condenser was charged, and to increase the grid control voltage of the other thyratron.

21. An apparatus according to claim 17 wherein the plate voltages of the two thyratrons are alike in phase.

22. An apparatus for automatically following a contour embodying the juncture of a non-conductive material with a conductive material, comprising a carriage, a conductive tracer mounted on said carriage and adapted to engage said contour, means for vibrating said tracer transversely of said contour and across said juncture, means for driving said carriage, means for steering said carriage to maintain said tracer in a position such that the amount of overlap between the tracer and the conductive material of the contour is maintained substantially constant, said steering means comprising electric motor means for steering said carriage, an electrical control circuit including said tracer and said contour, said circuit comprising electronic relay means for controlling said motor means to increase the amount of overlap between said tracer and said contour when the overlap becomes less than a predetermined amount and to decrease the amount of overlap between said tracer and said contour when the overlap becomes greater than said predetermined amount.

23. An apparatus according to claim 22 wherein the electronic relay means for controlling the motor includes two thyratron tubes supplied with alternating current, the current flowing through one of said thyratron tubes energizing the motor means to increase the overlap between the tracer and contour, and the current flowing through the other of said thyratron tubes energizing the motor means to decrease the overlap between the tracer and contour.

24. An apparatus according to claim 23 wherein the means for vibrating the tracer operates at the frequency of the alternating current supplied to the thyratrons.

25. Apparatus according to claim 24 wherein the vibrating tracer point is rotatable about and offset from an axis substantially normal to the plane of the contour, and having means for connecting the steering means to the tracer point to rotate the tracer point about said axis, whereby a plane passing through said axis and the tracer point will lie parallel to the direction of movement of said carriage as determined by said steering means.

26. An apparatus according to claim 24 wherein the electrical control circuit includes a bridge adapted to apply a positive voltage to the grid of, and thereby fire, the thyratron which energizes the motor means to increase the amount of overlap between tracer and contour at the time the circuit between tracer and contour is broken, and to apply a positive voltage to the grid of, and thereby fire, the thyratron which energizes the motor means to decrease the amount of overlap between tracer and contour at the time the circuit between the tracer and the contour is made.

27. Apparatus according to claim 24 wherein the thyratrons are phased 180° apart and wherein the means for vibrating the tracer comprises a polarized electromagnetic vibrator phased with respect to the thyratrons so that the tracer always vibrates in a direction away from the conductive material and toward the non-conductive material during the time a positive half cycle is applied to the plate of the thyratron which energizes the motor means to increase the amount of overlap between tracer and contour, and in the opposite direction during the time a positive half cycle is applied to the plate of the other thyratron.

28. In a contour reproducing apparatus having a contour support adapted to have a contour mounted thereon, a main carriage having means for automatically following a contour mounted on the support comprising electric motor driving means adapted to drive said carriage at substantially constant speed, a tracer and electric motor steering means for automatically steering said carriage to cause said tracer to follow along said contour; the combination of a magnetic switch controlling said steering means, said steering means being rendered ineffective when said switch is open and being placed in operation when said switch is closed, a manually operable switch for controlling said driving means, the closing of said switch starting said driving means, and means whereby said magnetic switch is energized and closed when said tracer reaches said contour, thereby placing said steering means in operation.

29. Means for controlling the supply of high pressure oxygen to the torch of a contour reproducing apparatus having a contour support adapted to have a contour mounted thereon, a main carriage having means for automatically following the contour comprising electric motor driving means for driving said carriage, a tracer, electric motor steering means for automatically steering said carriage to cause said tracer to follow said contour, a cutting torch, means connecting said cutting torch and said carriage and constraining said torch to duplicate the path of movement of said carriage, said means for controlling the high pressure oxygen supply comprising an electrically operated valve for controlling said high pressure oxygen, a magnetic switch controlling said steering means, said steering means being rendered ineffective when said switch is open and being placed in operation when said switch is closed, a manually operable switch for controlling said driving means and said valve, the closing of said switch starting said driving means and opening said valve, and means whereby said magnetic switch is energized and closed when said tracer reaches said contour thereby placing said steering means in operation.

30. An apparatus according to claim 28 wherein the contour to be reproduced comprises a conductive pattern on a non-conductive background, the circuit to the magnetic switch including the plate-cathode circuit of an electronic tube, and circuit means for firing said tube and thereby supplying current to said magnetic switch and closing said magnetic switch when the tracer makes electrical contact with the conductive pattern.

31. The method of automatically following a contour with a tracer which includes the steps of propelling the tracer along the contour and steering the tracer to cause it to follow the contour, employing an electrical circuit embodying alternating current for controlling the steering, making and breaking the circuit once during each cycle of said alternating current, varying the times in the cycle at which the circuit is made and broken in accordance with the position of the tracer with respect to the contour, and automatically steering the tracer in accordance with the times in each cycle at which the circuit is made and broken.

32. Apparatus for automatically following a contour comprising a carriage, means for driving said carriage and means for steering said carriage to cause said carriage to follow the contour comprising an electric motor for steering said carriage, electronic relay means for controlling said motor, said electronic relay means including two thyratron tubes, the current flowing through one of said thyratron tubes energizing the motor to steer the carriage toward the contour and the current flowing through the other of said thyratron tubes energizing the motor to steer the carriage away from the contour, means for supplying alternating current to the plate-cathode circuits of said thyratron tubes, and means for controlling the firing of said thyratron tubes thereby to control the flow of current through said tubes including a vibrating element vibrating in synchronism with said alternating current supply, a circuit including said vibrating element and the grids of said thyratron tubes said vibrating element controlling the flow of current to the grids of said thyratron tubes and varying said flow in accordance with the position of said carriage with respect to said contour.

WENDELL L. MARTIN.

REFERENCES CITED

The following references are of record in the file of this patent:

UNITED STATES PATENTS

| Number | Name | Date |
|---|---|---|
| 2,017,475 | Schmidt | Oct. 15, 1935 |
| 2,057,820 | Corwin | Oct. 20, 1936 |
| 2,199,103 | Jeffreys | Apr. 30, 1940 |
| 2,261,644 | Cockrell | Nov. 4, 1941 |
| 2,262,354 | Cates | Nov. 11, 1941 |
| 2,359,037 | Hofrichter | Sept. 26, 1944 |

FOREIGN PATENTS

| Number | Country | Date |
|---|---|---|
| 141,119 | Austria | Mar. 25, 1935 |
| 588,188 | Germany | Nov. 16, 1933 |